United States Patent
Wang et al.

(10) Patent No.: US 8,175,180 B2
(45) Date of Patent: May 8, 2012

(54) PRE-ENCODING AND PRE-DECODING APPARATUSES AND METHODS THEREOF

(75) Inventors: Huan-Chun Wang, Taipei County (TW); De-Jhen Huang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 928 days.

(21) Appl. No.: 12/188,182

(22) Filed: Aug. 7, 2008

(65) Prior Publication Data

US 2009/0221236 A1    Sep. 3, 2009

(30) Foreign Application Priority Data

Feb. 29, 2008    (TW) .............................. 97106995 A

(51) Int. Cl.
H04L 5/12    (2006.01)
H04L 23/02    (2006.01)

(52) U.S. Cl. ........ 375/262; 375/265; 375/341; 714/792; 714/794; 714/796

(58) Field of Classification Search .................. 375/262, 375/265, 341; 714/792, 794, 796
See application file for complete search history.

(56) References Cited

U.S. PATENT DOCUMENTS

| | | | |
|---|---|---|---|
| 6,023,783 A | | 2/2000 | Divsalar et al. |
| 6,549,574 B1 | | 4/2003 | De Bart et al. |
| 2001/0009569 A1* | | 7/2001 | Kang et al. ..................... 375/242 |
| 2002/0061078 A1* | | 5/2002 | Cameron ....................... 375/341 |
| 2007/0223622 A1 | | 9/2007 | Bang et al. |
| 2008/0016426 A1 | | 1/2008 | Li et al. |

FOREIGN PATENT DOCUMENTS

| | | |
|---|---|---|
| CN | 1400827 | 3/2003 |
| WO | 91-13437 | 9/1991 |
| WO | 97-40582 | 10/1997 |

OTHER PUBLICATIONS

"First Office Action of China Counterpart Application", issued on May 20, 2011, p. 1-p. 9.
"Office Action of Taiwan Counterpart Application", issued on Feb. 21, 2011, p. 1-p. 5.
Renqiu Wang et al., "Combining galois with complex field coding for high-rate space-time communications", appears in: Sensor Array and Multichannel Signal Processing Workshop Proceedings, Issued on Aug. 4-6, 2002, pp. 570-574.
"Extended European Search Report of Europe Counterpart Application", issued on Jan. 5, 2012, p1-p7, in which the listed references were cited.

* cited by examiner

*Primary Examiner* — Ted Wang
(74) *Attorney, Agent, or Firm* — Jianq Chyun IP Office

(57) ABSTRACT

A pre-encoding apparatus and a pre-decoding apparatus are provided. The pre-encoding apparatus adopts a cascade structure constituted by a plurality of pre-encoding units and a plurality of interleavers for pre-encoding, and the pre-decoding apparatus adopts a cascade structure constituted by a plurality of pre-decoding units and a plurality of de-interleavers for pre-decoding. Therefore, the pre-decoding apparatus is featured with a lower error rate. Also, each of the pre-decoding units can be alternatively composed of a plurality of low dimensional pre-decoders so that a computation complexity of the pre-decoding apparatus can be reduced accordingly.

19 Claims, 20 Drawing Sheets

PRE-ENCODING AND PRE-DECODING APPARATUSES AND METHODS THEREOF

CROSS-REFERENCE TO RELATED APPLICATION

This application claims the priority benefit of Taiwan application serial no. 97106995, filed on Feb. 29, 2008. The entirety of the above-mentioned patent application is hereby incorporated by reference herein and made a part of specification.

BACKGROUND OF THE INVENTION

1. Field of the Invention

The present invention generally relates to a pre-encoding and pre-decoding apparatuses and methods thereof, and more particularly, to the pre-encoding and pre-decoding apparatuses and the methods thereof which are adapted for an orthogonal frequency-division multiplexing (OFDM) system.

2. Description of Related Art

In a communication field, an encoding technology is used for compressing a length of a transmitted signal, or for protecting the transmitted signal so as to reduce errors caused by the transmission. As the detection theory is being developed, equalization technologies and noise estimation methods are gradually becoming sophisticated. Therefore, the receiver end now is capable of estimating what the data to be received would be according to the characteristic of the transmission channel.

Supposing a receiver receives a signal y=Hx+n, wherein y represents a received signal vector, and $y=[y_1, y_2, \ldots, y^m]^T$; x represents a signal vector transmitted by a transmitter, and $x=[x_1, x_2, \ldots, x_m]^T$; n represents a noise vector, and $n=[n_1, n_2, \ldots, n_m]^T$; H represents a channel response matrix, and is defined as:

$$H = \begin{bmatrix} h_{1,1} & h_{1,2} & \cdots & \cdots & h_{1,m} \\ h_{2,1} & h_{2,2} & \cdots & \cdots & h_{2,m} \\ h_{3,1} & h_{3,2} & \cdots & \cdots & h_{3,m} \\ \vdots & \vdots & \ddots & \ddots & \vdots \\ h_{m,1} & h_{m,2} & \cdots & \cdots & h_{m,n} \end{bmatrix},$$

wherein $h_{i,j}$ represents a channel response of a transmitted signal $x_j$ to a received signal $y_i$.

In general, a best solution $\hat{x}$ (i.e. a solution with a lowest error rate) can be obtained by a method of maximum a posteriori (MAP) estimation, wherein $\hat{x}$ is defined as:

$$\hat{x} = \underset{x}{\operatorname{argmax}} p(y \mid x).$$

After deduction $\hat{x}$ can be represented as:

$$\hat{x} = \underset{x}{\operatorname{argmin}} \frac{1}{2\sigma_n^2} [y - Hx]^T [y - Hx] - \ln p(x),$$

wherein $\sigma_n^2$ represents a power of the noise, and p(x) represents a probability of transmitting x. In other words, finding an x lets $$\frac{1}{2\sigma_n^2}[y-Hx]^T[y-Hx] - \ln p(x)$$

achieve a minimum value correspondingly. And in this manner, the solved x is the best solution $\hat{x}$. If each outcome of x has the equivalent probability, then the above equation becomes $$\hat{x} = \underset{x}{\operatorname{argmin}}[y - Hx]^T[y - Hx],$$

which is a solution of a maximum likelihood (ML). However, no matter the MAP method or the ML method, its computation complexity to obtain the solution is very high. Suppose to transmit a binary phase shift keying (BPSK), and comparing each outcome of x, there is a computation complexity of $O(2^m)$. As such, even though theoretical best solutions are exemplified above, the computation complexity thereof is very high, as such can be rarely put in use.

Further, in order to reduce the computation complexity, the receiver may implement a linear detection method. Typical linear detection methods include zero forcing (ZF) equalization technology and minimum mean square error (MMSE) equalization technology.

When the receiver adopts a ZF equalization technology, the solved signal is $\hat{x}=H^{-1}y$, which computation complexity is $O(m^3)$. In this manner, although the computation complexity can be reduced by adopting the ZF equalization technology, a correction rate of the solved $\hat{x}$ is not as high as when using the ML method.

When the receiver adopts an MMSE equalization technology, the solved signal is $\hat{x}=\overline{W}y$, wherein the matrix $\overline{W}$ can be represented as $$\overline{W} = \underset{W}{\operatorname{argmin}} \|x - Wy\|^2.$$

That is to find a matrix $\overline{W}$, by which a sum of a mean square deviation of a solved $\hat{x}$ and the originally transmitted signal x is minimum. The matrix $\overline{W}=R_{xy}R_y^{-1}$ can be obtained by a differential approach, wherein $R_{yx}=E[xy^T]$, $R_y=E[yy^T]$. Accordingly, an equation $$\overline{W} = \left(H^*H + \frac{\sigma_n}{\sigma_x}\right)^{-1} H^*$$

can be obtained by summarizing the above equations, wherein I represents an identity matrix, while $\sigma_n^2$ and $\sigma_x^2$ respectively represent powers of the transmitted signal x and the noise n. The solved signal $\hat{x}$ by the MMSE equalization technology has a higher correction rate than the ZF equalization technology, and has a complexity of $O(m^3)$. However, the correction rate thereof is still not as high as when using the ML method.

In order to enhance the correction rate of the receiver, methods of iterative detection have been proposed. Currently, they typically include vertical Bell Labs layered space-time (VBLAST) detection method, iterative multi-user detection (MUD) method, and sphere decoding method.

The VBLAST detection method is developed by Bell Labs. The VBLAST detection method is mainly applied in multiple input multiple output (MIMO) communication systems or space time multiplexing communication systems. Besides the MMSE estimation, the VBLAST detection method further adopts an interference cancellation approach to enhance the entire performance thereof, so that it can achieve a performance better than those of the ZF and MMSE equalization technologies.

The VBLAST detection method firstly uses the MMSE method for estimating $\hat{x}_0 = Z^T y$, wherein $Z^T$ is a coefficient matrix of MMSE. Then, a $\hat{x}_{k0}$ having a maximum signal to noise ratio (SNR) is found out from $\hat{x}_0$. Then, $\text{sgn}(\hat{x}_{k0})$ can be obtained by a hard decision, wherein $\text{sgn}(\bullet)$ is an operator for a sign operator, and when $\hat{x}_{k0} > 0$, $\text{sgn}(\hat{x}_{k0}) = 1$, and when $\hat{x}_{k0} < 0$, $\text{sgn}(\hat{x}_{k0}) = -1$. Then, after cancelling the interfering items, an equation of $y_1 = y - \text{sgn}(\hat{x}_{k0}) \cdot HE_{k0}$ can be obtained, wherein $E_j$ is a N×1 matrix, and its all elements other than the $j^{th}$ are 0. When the noise is further considered, then the equation becomes $y_1 = Hx - \text{sgn}(\hat{x}_{k0}) \cdot HE_{k0} + n$, and an MMSE computation is repeated to obtain $\hat{x}_1 = Z^T y_1$. Then, a maximum element $\hat{x}_{k1}$ having a maximum SNR is found out from $\hat{x}_1$, and a hard decision is made to obtain $\text{sgn}(\hat{x}_{k1})$. Then, interfering items are cancelled to obtain $y_2 = y_1 - \text{sgn}(\hat{x}_{k1}) \cdot HE_{k1}$. The foregoing steps are repeated until all elements of x are determined by hard decisions. Accordingly, a VBLASAT requires m times MMSE estimations, so that it is featured with a computation complexity of $O(m^4)$. In this manner, although it has a higher complexity than MMSE and ZF, the VBLAST has a performance much better than MMSE and ZF.

In another hand, a receiver implementing an iterative MUD method is to find out a vector $\overline{w}_k = \arg_{w_k} \min \|x_k - w_k^T(y - H\vec{x}_k)\|^2$, and relies upon $\overline{w}_k$ to obtain $\hat{x}_k$, wherein $\vec{x}_k = [\hat{x}_1 \hat{x}_2 \ldots \hat{x}_{k-1} \ 0 \ \hat{x}_{k+1} \ldots \hat{x}_m]$. Therefore, $\overline{w}_k$ is used to solve $$\hat{x}_k = \tanh\left(\frac{2z_k}{1 - u_k}\right),$$

wherein $z_k = R_{y,k}\{\overline{w}_k^T(y - H\vec{x}_k)\}$, $\overline{w}_k = R_{y,k}^{-1} h_k$, $u_k = h_k^H R_{y,k}^{-1} h_k$, $R_{y,k} = h_k h_k^T + HE[\vec{x}\vec{x}^H]H^H + \sigma_n^2 I$. The receiver which implements such an iterative MUD has a higher correction rate than the VBLAST, and its computation complexity is $O(m^4)$.

Furthermore, in order to obtain the best solution and to improve the decoding correction rate of the receiver, the receiver may alternatively adopt a sphere decoding method. A receiver implementing the sphere decoding method finds out $\hat{x} = \arg_x \min |y - Hx'|$, (i.e. find out $(x - \hat{x})HH^H(x - \hat{x}) \leq r^2$), wherein r represents a searching radius for sphere decoding. Then the receiver implementing the sphere decoding method obtains the final best solution according to an iterative computation. Although the receiver implementing such a sphere decoding method has a higher correction rate than the receiver implementing an iterative MUD method, the computation complexity of the receiver is a non-deterministic polynomial time complete (NPC) problem.

The above iterative detection method may allow the receiver to obtain a better correction rate, however the computation complexity thereof is not as low as that of the linear detection method. Hence, the computation complexity of the iterative detection method is not good for real time transmission, e.g., video streaming. As to the linear detection method, it has a so low correction rate that is not suitable for transmission channels under bad conditions. As such, the present invention provides a pre-encoding apparatus and a pre-decoding apparatus. The pre-encoding apparatus and the pre-decoding apparatus are adapted for a communication system, and the pre-decoding apparatus is featured with a lower computation complexity and is adapted to decode the received signal to obtain a signal with a lower error rate.

SUMMARY OF THE INVENTION

The embodiments of the present invention provide a pre-encoding apparatus, a pre-decoding apparatus and methods thereof, which can be implemented in a fourth generation (4G) mobile communication system, and have advantages of low computation complexity and low error rate.

The embodiment of the present invention provides a system for pre-encoding and pre-decoding. The system for pre-encoding and pre-decoding includes a pre-encoding apparatus and a pre-decoding apparatus. The pre-encoding apparatus receives a transmitting signal vector having a plurality of transmitting signals, and conducts m times encoding and i times interleaving to the transmitting signal vector, wherein m≧2, and i≧1. The pre-encoding apparatus is constituted by discretionarily serially connected m pre-encoding units and i interleavers. The transmitting signal vector is sent via the pre-encoding apparatus to a channel and forms a receiving signal vector having a plurality of receiving signals. The pre-decoding apparatus obtains the receiving signal vector from the channel, and conducts n times decoding and j times de-interleaving to the receiving signal vector so as to derive the transmitting signal vector, wherein n≧2, and j≧1. The pre-decoding apparatus is constituted by serially connected n pre-decoding units and j de-interleavers.

The embodiment of the present invention provides a pre-encoding apparatus, and the pre-encoding apparatus includes i interleavers and m pre-encoding units. Wherein the i interleavers and the m pre-encoding units are discretionarily serially connected. The pre-encoding apparatus receives the transmitting signal vector having a plurality of transmitting signals, and conducts m times encoding and i times interleaving to the transmitting signal vector, wherein m≧2, and i≧1.

The embodiment of the present invention provides a pre-decoding apparatus, and the pre-decoding apparatus includes j de-interleavers and n pre-decoding units. The j de-interleavers and the n pre-decoding units are serially connected. Wherein the pre-decoding apparatus receives the receiving signal vector having a plurality of receiving signals from a channel, and conducts n times decoding and a j times de-interleaving to the receiving signal vector, so as to derive the transmitting signal vector, wherein n≧2, and j≧1.

The embodiment of the present invention provides a pre-encoding method. First, conduct m times encoding and i times interleaving to a transmitting signal vector having a plurality of transmitting signals, wherein m≧2, and i≧1, and the sequence of encoding and interleaving is not restricted hereby. And then, the transmitting signal vector after being conducted with m times encoding and i times interleaving is outputted.

The embodiment of the present invention provides a pre-decoding method. First, conduct n times decoding and j times de-interleaving to a receiving signal vector having a plurality of receiving signals, wherein n≧2, and j≧1. And then, a receiving signal vector after being conducted with n times decoding and j times de-interleaving is outputted.

According to the embodiment of the present invention, the pre-encoding apparatus adopts a cascade structure composed of serially connected pre-encoding units and interleavers for performing a pre-encoding process, and the pre-decoding apparatus adopts a cascade structure composed of serially connected pre-decoding units and de-interleavers for performing a pre-decoding process. Therefore, the pre-decoding apparatus achieves a lower error rate, and each of the foregoing pre-decoding units can be constituted of a plurality of low dimensional pre-decoders so as to farther reduce the computation complexity thereof.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
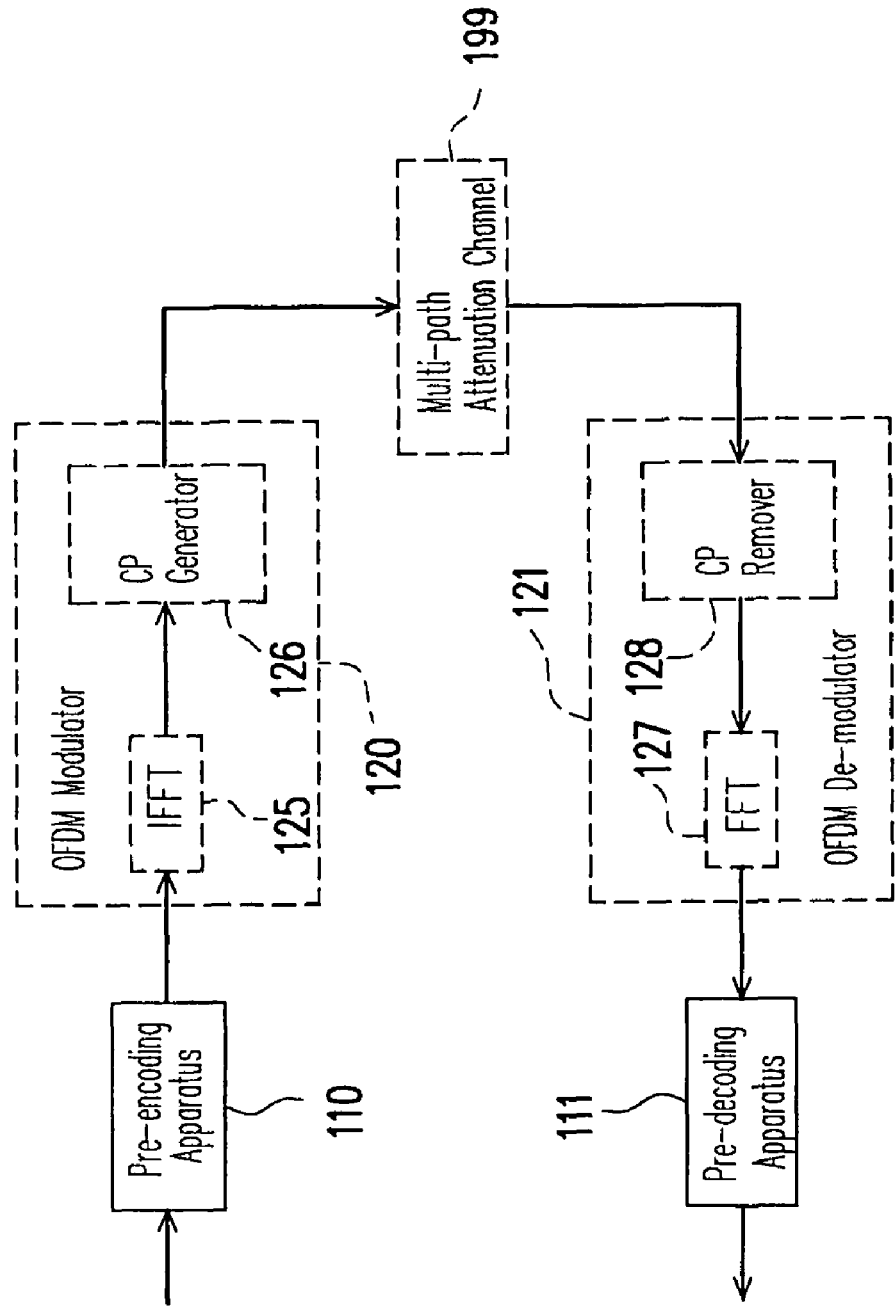
FIG. 1 is a system block diagram illustrating an orthogonal frequency-division multiplexing access (OFDMA) system having a pre-encoding apparatus 110 and a pre-decoding apparatus 111 according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The embodiments of the present invention concern to decrease an error rate and a computation complexity at a receiver terminal by pre-encoding at the transmitter terminal and pre-decoding at the receiver terminal.

FIG. 1 is a system block diagram illustrating an orthogonal frequency-division multiplexing access (OFDMA) system having a pre-encoding apparatus 110 and a pre-decoding apparatus 111 according to an embodiment of the present invention. Referring to FIG. 1, the OFDMA system 10 includes a pre-encoding apparatus 110, a pre-decoding apparatus 111, an OFDM modulator 120, and an OFDM demodulator 121. The pre-encoding apparatus 110 performs a pre-encoding process to a transmitting signal vector prior to transmitting it to the OFDM modulator 120. The transmitting signal vector includes a plurality of transmitting signals. The OFDM modulator 120 includes an inverse fast Fourier transform (IFFT) 125, and a cyclic prefix (CP) generator 126. The IFFT 125 performs an OFDM modulation to the transmitting signal vector pre-encoded by the pre-encoding apparatus 110. The CP generator 126 then adds CPs into the OFDM modulated transmitting signal vector. Finally, such a transmitting signal vector is transmitted to a multi-path fading channel 199.

Then, the OFDM demodulator 121 receives a receiving signal vector from the multi-path fading channel 199. The receiving signal vector includes a plurality of receiving signals. The OFDM demodulator 121 includes a CP remover 128 and a fast Fourier transform (FFT) 127. The CP remover 128 removes CPs from the receiving signal vector. Then the FFT 127 demodulates the receiving signal vector. The pre-decoding apparatus 111 performs a pre-decoding process corresponding to the pre-encoding process performed by the pre-encoding apparatus 110 to the demodulated receiving signal vector, so as to obtain a correct transmitting signal vector.

The pre-encoding apparatus 110 conducts m times encoding and i times interleaving to the transmitting signal vector. Correspondingly, the pre-decoding apparatus 120 conducts n times decoding and j times de-interleaving. The sequence of encoding and interleaving conducted by the pre-encoding apparatus 110 is not restricted hereby, and the sequence of decoding and de-interleaving conducted by the pre-decoding apparatus 111 is also not restricted hereby. However, it should be noted that the $j^{th}$ de-interleaving conducted by the pre-decoding apparatus 111 is adapted to correspondingly solve a signal vector obtained by the $i^{th}$ interleaving conducted by the pre-encoding apparatus 110 back the signal vector as being not conducted with the $i^{th}$ interleaving. Similarly, it should also be noted that the $n^{th}$ decoding conducted by the pre-decoding apparatus 111 is adapted to correspondingly solve a signal vector obtained by the $m^{th}$ encoding conducted by the pre-encoding apparatus 110 back to the signal vector as being not conducted with the $m^{th}$ encoding. The above statements do not intend to limit the scope of the present invention. In another one implementation, the $n^{th}$ decoding and $j^{th}$ de-interleaving conducted by the pre-decoding apparatus 111 is adapted to correspondingly solve a signal vector obtained by the $m^{th}$ encoding and $i^{th}$ interleaving conducted by the pre-encoding apparatus 110 back to the signal vector as being not conducted with the $m^{th}$ encoding and $i^{th}$ interleaving.

Taking conducting two times encoding and once interleaving as an example, the pre-encoding apparatus 110 conducts encoding, interleaving, encoding to the transmitting signal vector in sequence, and correspondingly the pre-decoding apparatus 111 conducts decoding (for example MAP decoding), de-interleaving, and decoding to the receiving signal vector. The times of encoding and decoding can be 2 or more, and the times of interleaving and de-interleaving can be 1 or more. According to an aspect of the embodiment, it is preferred that the times for encoding and decoding are symmetric and the times for interleaving and de-interleaving are also symmetric (i.e. i=j, and m=n).

Taking an asymmetric condition as another example, the times for encoding and decoding are asymmetric and the times for interleaving and de-interleaving are also asymmetric. In this example, the pre-encoding apparatus 110 conducts an operation including interleaving, encoding, interleaving, encoding, interleaving, encoding in sequence. Correspondingly, the pre-decoding apparatus 111 may conduct a decoding which is equivalent as a counter operation of the foregoing first two times interleaving and first two times encoding, and thereafter conduct a de-interleaving and a decoding to obtain the original transmitting signal vector. In other words, the sequence and times of encoding and interleaving conducted by the pre-encoding apparatus 110 are not restricted hereby, and the sequence and times of decoding and de-interleaving by the pre-decoding apparatus 111 are also not restricted hereby. Further, times of conducting interleaving and de-interleaving are not required to be identical, and times of conducting encoding and decoding are not required to be identical either.

Although the foregoing pre-encoding apparatus 110 and the pre-decoding apparatus 111 are exemplified as adapted for an OFDMA system 10, it is not to limit the scope of the present invention as applied therein. The pre-encoding apparatus 110 and the pre-decoding apparatus 111 can also be used for a multi-carrier code division multiplexing access (MC-CDMA) system, an orthogonal frequency code division multiplexing (OFCDM) system, an interleaved frequency division multiplexing access (IFDMA) system, or a long term evolution (LTE) system for 4G mobile communications.

Figure 2A:
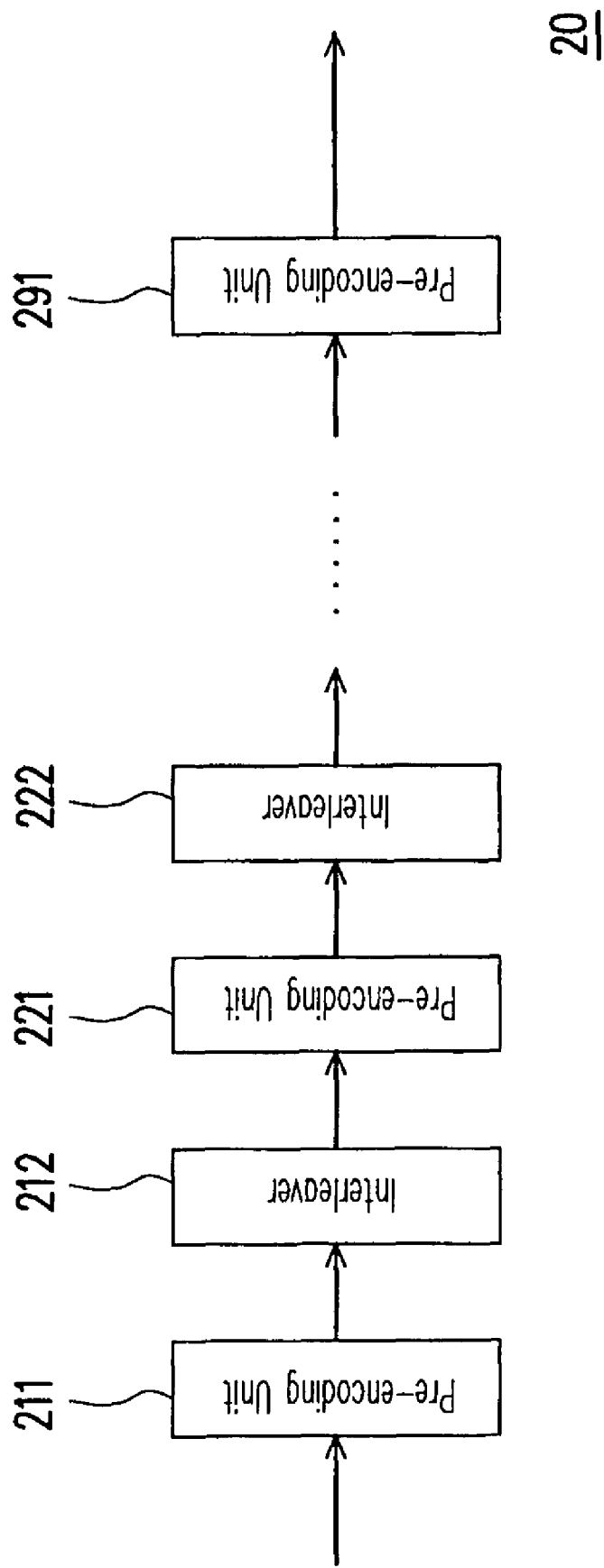
FIG. 2A is a system block diagram illustrating a pre-encoding apparatus 20 according to an embodiment of the present invention.

Referring to FIG. 2A, FIG. 2A is a system block diagram illustrating a pre-encoding apparatus 20 according to an embodiment of the present invention. The pre-encoding apparatus 20 includes a plurality of pre-encoding units 211, 221 . . . 291, and interleavers 212, 222 . . . 282. Wherein the input terminal of the pre-encoding unit 211 is coupled to an input terminal of the pre-encoding apparatus 20. The output terminals of the pre-encoding units 211, 221 . . . 291 are correspondingly coupled to the input terminals of the interleavers 212, 222 . . . 282, respectively. The output terminals of the interleavers 212, 222 . . . 282 are correspondingly coupled to the input terminals of the pre-encoding units 221 . . . 291, respectively. The output terminal of the pre-encoding unit 291 is coupled to an output terminal of the pre-encoding apparatus 20. The pre-encoding units 211, 221 . . . 291 are used for encoding, and the interleavers 212, 222 . . . 282 are used for interleaving.

Although the foregoing embodiment is exemplified with 9 pre-encoding units and 8 interleavers, it is not provided for restricting the scope of the present invention. Quantities of the pre-encoding units and the interleavers are not restricted. However, it should be noted that the quantity of the pre-encoding units should be 2 or more than 2. Further, the connection of the pre-encoding units and the interleavers are not used to restrict the present invention, and they can be serially connected with a random sequence.

Figure 2B:
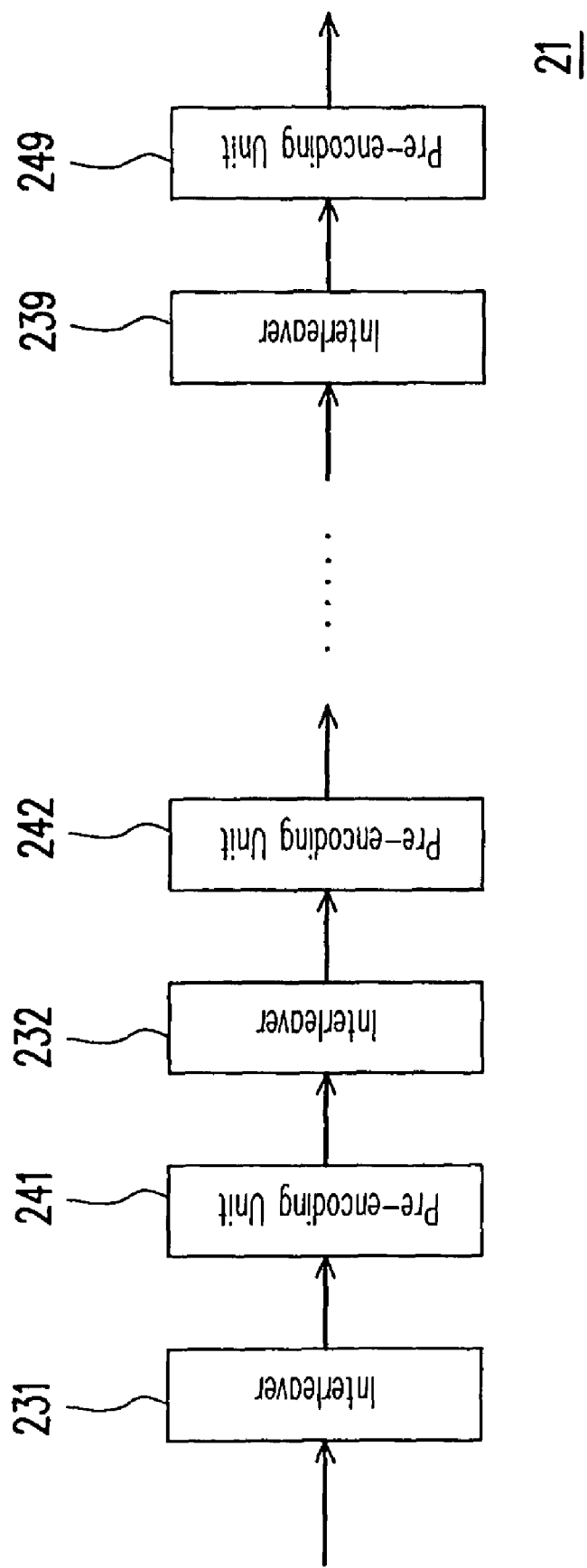
FIG. 2B is a system block diagram illustrating a pre-encoding apparatus 21 according to an embodiment of the present invention.

FIG. 2B is a system block diagram illustrating a pre-encoding apparatus 21 according to an embodiment of the present invention. Referring to FIG. 2B, the pre-encoding apparatus 21 includes pre-encoding units 241, 242 . . . 249, and interleavers 231, 232 . . . 238, 239. Wherein, the input terminal of the interleaver 231 is coupled with an input terminal of the pre-encoding apparatus 21. The output terminals of the interleavers 231, 232 . . . 239 are correspondingly coupled to the input terminals of the pre-encoding units 241, 242 . . . 249, respectively. The output terminals of the pre-encoding units 241, 242 . . . 248 are correspondingly coupled to the input terminals of the interleavers 232, 233 . . . 239, respectively. The output terminal of the pre-encoding unit 249 is coupled with an output terminal of the pre-encoding apparatus 21. The pre-encoding units 241, 242 . . . 249 are used for encoding, and the interleavers 231, 232 . . . 239 are used for interleaving. It can be learnt from FIGS. 2A and 2B that the connection of the pre-encoding units and the interleavers of the embodiments as shown in FIGS. 2A and 2B are not restricted, and the pre-encoding units and the interleavers can be randomly serially connected in accordance with the demand of the users.

Further, the foregoing pre-encoding units 211, 221 . . . 291, 241, 242 . . . 249 can be realized with low dimensional pre-encoders, so as to reduce the computation complexity. See FIGS. 2C through 2F, FIGS. 2C through 2F are schematic block diagrams illustrating different implementations of pre-encoding apparatuses 201 through 204 respectively according to embodiments of the present invention.

Figure 2C:
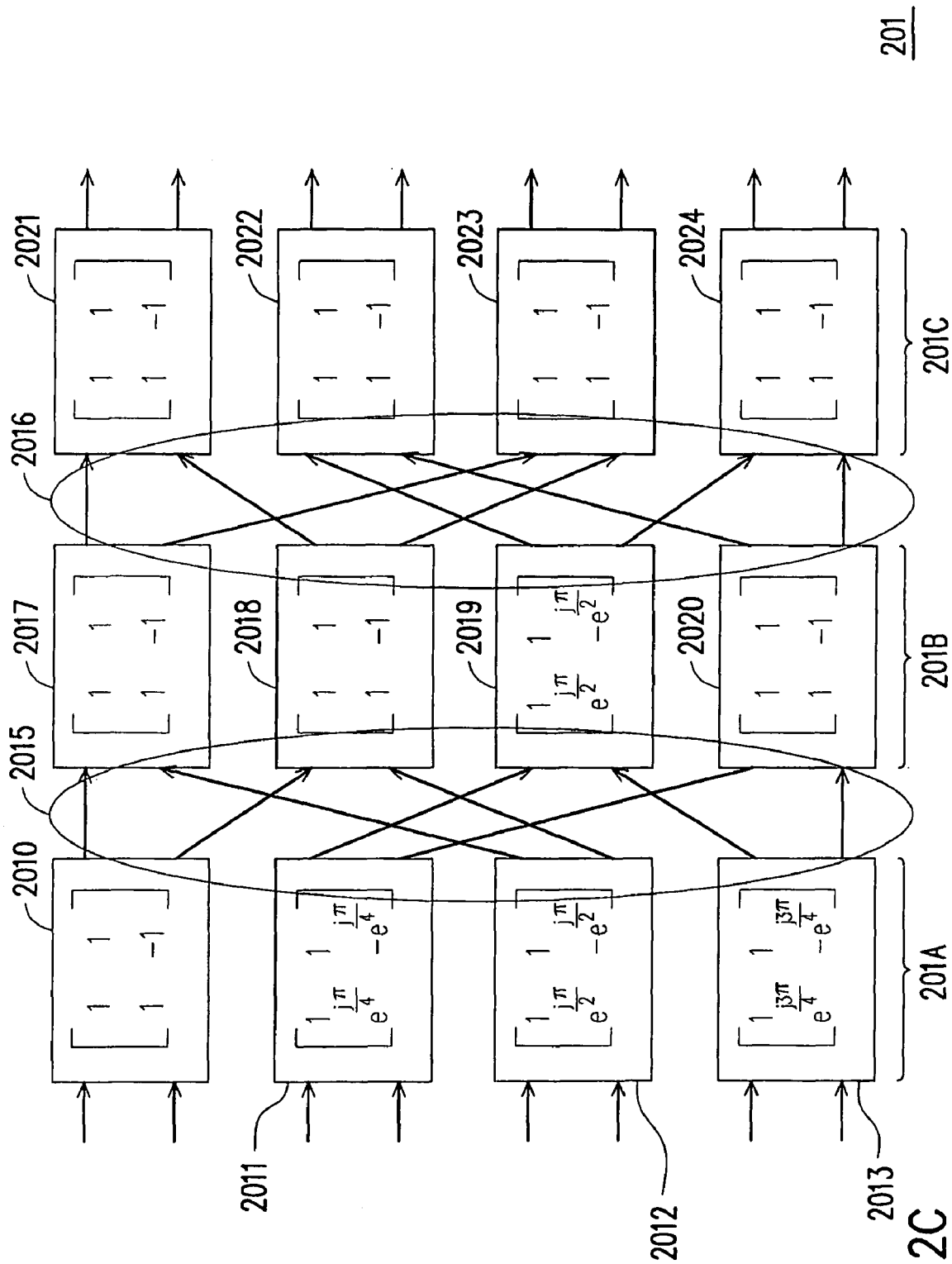
FIGS. 2C through 2F are schematic block diagrams illustrating different implementations of pre-encoding apparatuses 201 through 204 respectively according to embodiments of the present invention.

Referring to FIG. 2C, the pre-encoding apparatus 201 includes three pre-encoding units 201A, 201B, 201C, and two interleavers 2015, 2016. The first pre-encoding unit 201A is composed of a Hadamard encoder 2010, and three discrete Fourier transform (DFT) code encoders 2011, 2012, 2013. In such a way, an 8-dimensional pre-encoding apparatus is thus configured by the four 2-dimensional encoders 2010 through 2013. As to the interleavers 2015 and 2016, they are configured by the connections of the wires as shown in FIG. 2B. The second pre-encoding unit 201B is composed of a plurality of encoders 2017 through 2020, each of which having a lower dimension than that of the pre-encoding unit 201B. The third pre-encoding unit 201C is composed of a plurality of encoders 2021 through 2024, each of which having a lower dimension than that of the pre-encoding unit 201C.

Figure 2D:
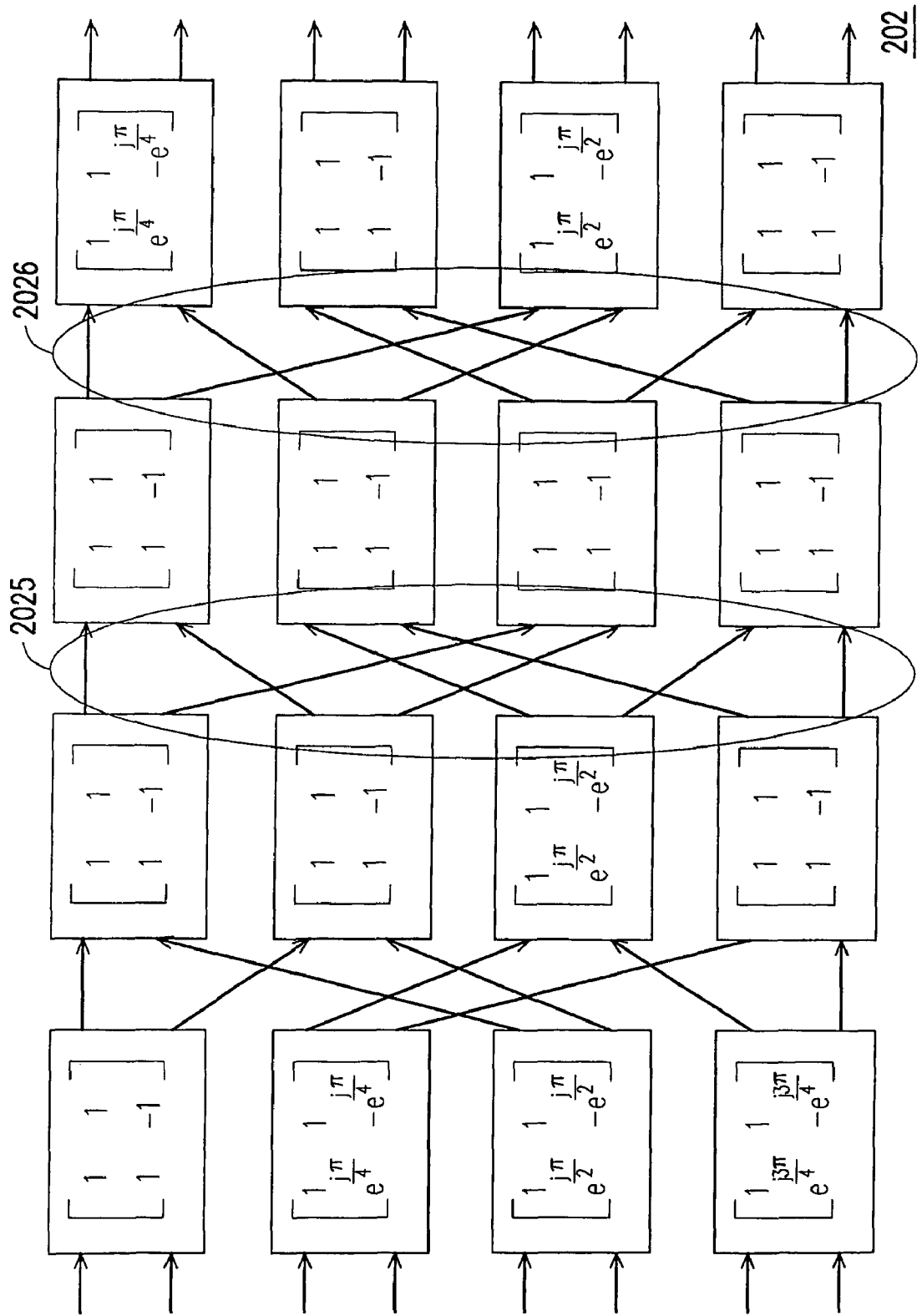
Figure 2E:
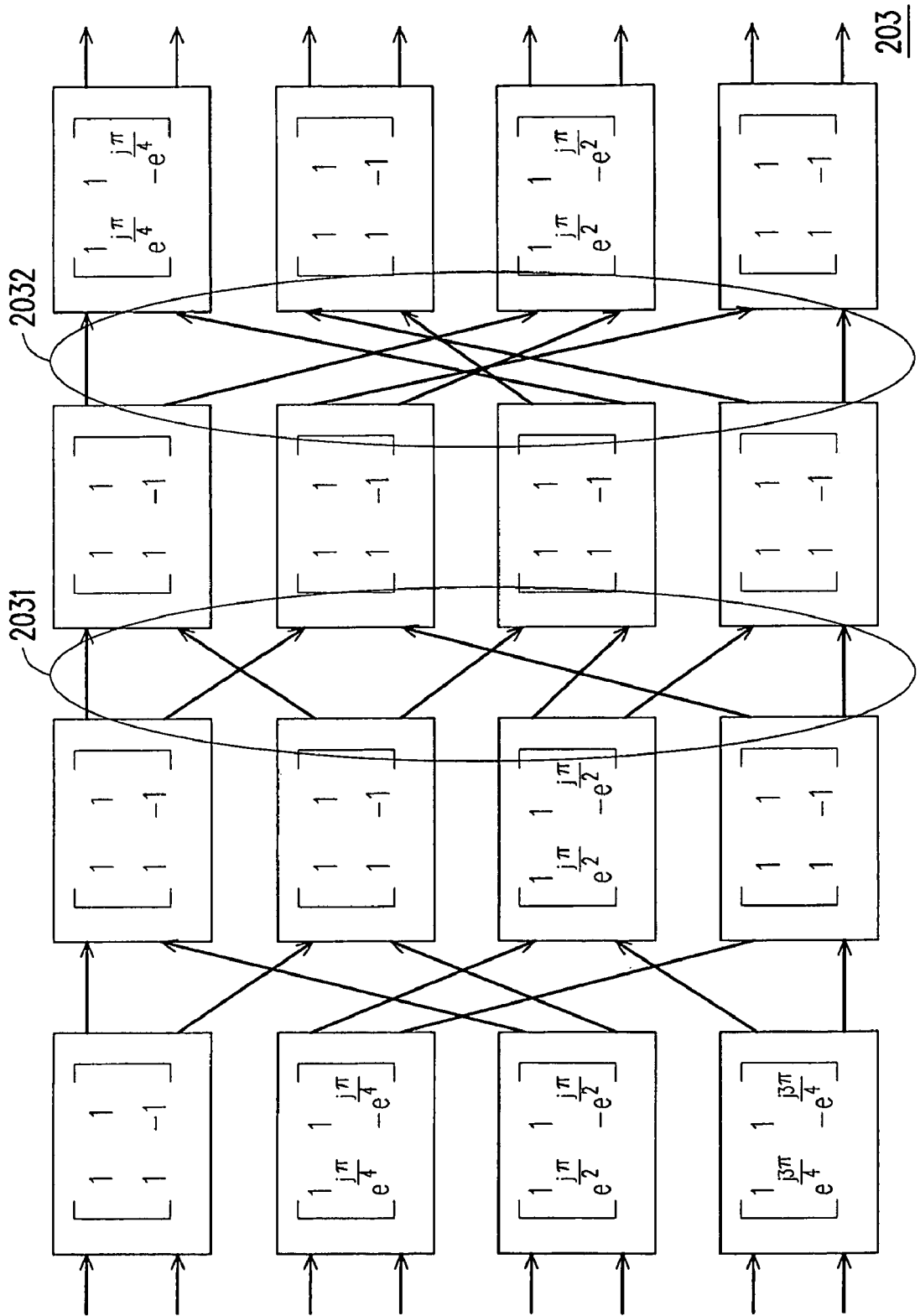
Figure 2F:
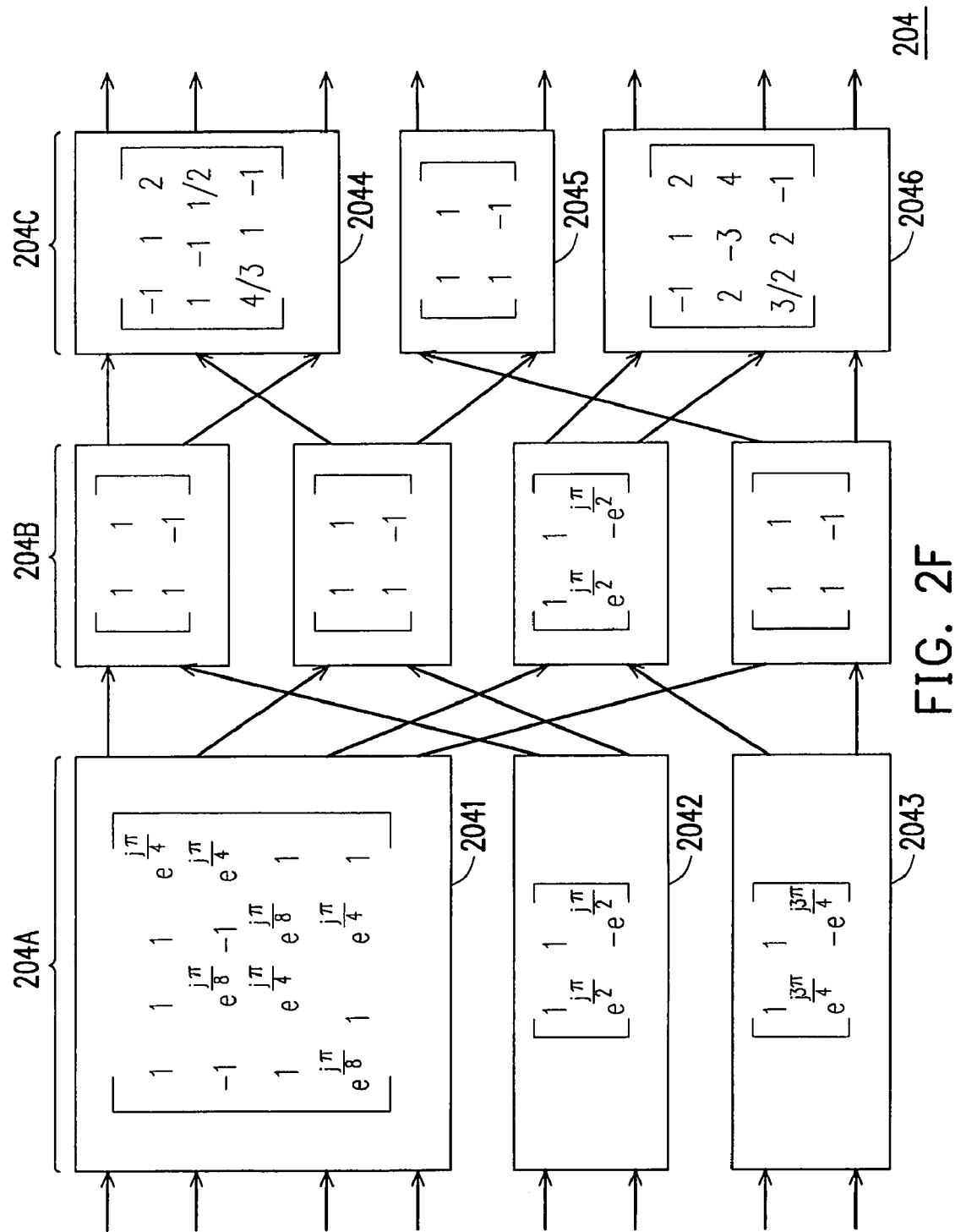

In the embodiments of FIGS. 2D and 2E, each of the pre-encoding apparatuses 202 and 203 has four pre-encoding unit and three interleavers. However, interleavers 2025 and 2026 of the pre-encoding apparatus 202 provided in FIG. 2D are different from interleavers 2031 and 2032 of the pre-encoding apparatus 203 provided in FIG. 2E. Furthermore, as shown in FIG. 2F, the pre-encoding unit 204A is composed of a 4-dimensional discrete Fourier encoder 2041 and two 2-dimensional discrete Fourier encoders 2042, 2043, and the pre-encoding unit 204C is composed of two 3-dimensional encoders 2044, 2046 and a 2-dimensional Hadamard encoder 2045. Wherein, the encoders 2044 and 2046 can be any coefficient encoders.

As described above, the interleavers provided in the pre-encoding apparatuses of the embodiments are not restricted, and each of the pre-encoding unit of the pre-encoding apparatus can be composed of a plurality of encoders. These encoders can be low dimensional encoders without restricting the dimensions thereof. Further, kinds or types of the pre-encoders are also not restricted, so that users may select encoders in accordance with the practical need.

Figure 3A:
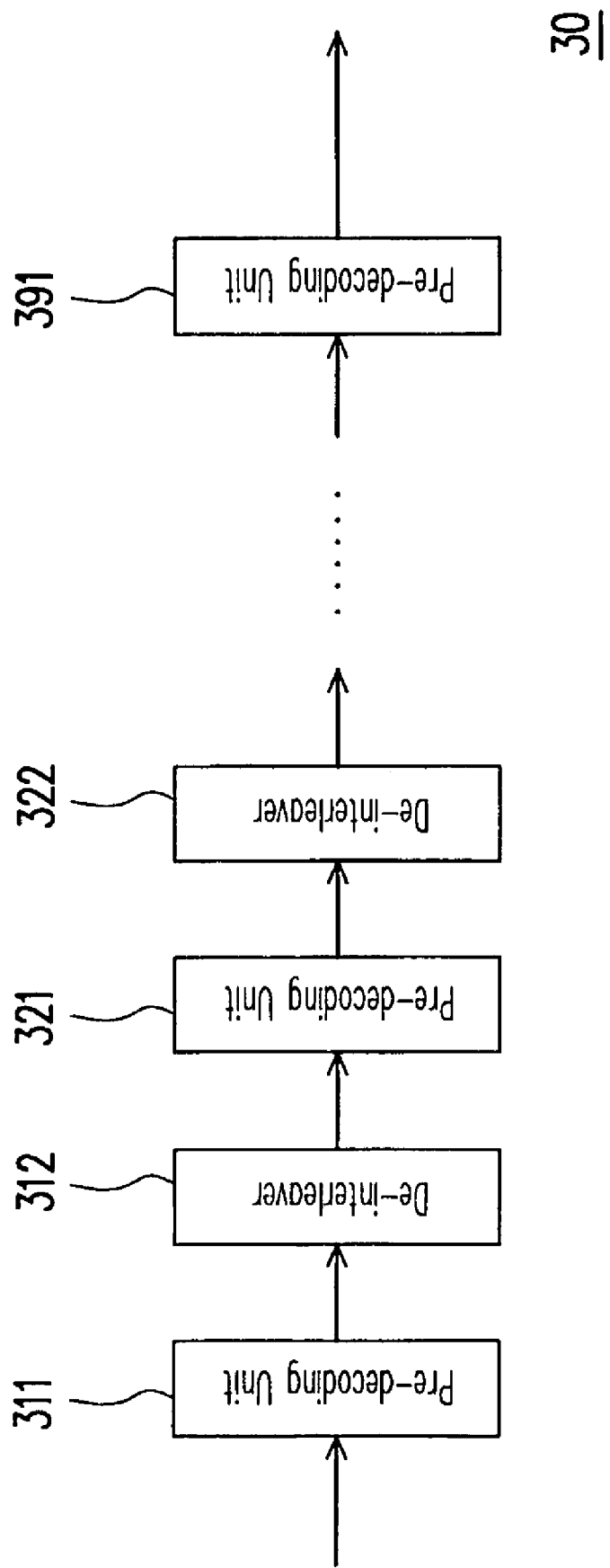
FIG. 3A is a system block diagram illustrating a pre-decoding apparatus 30 according to an embodiment of the present invention.

FIG. 3A is a system block diagram illustrating a pre-decoding apparatus 30 according to an embodiment of the present invention. Referring to FIG. 3A, the pre-decoding apparatus 30 includes a plurality of pre-decoding units 311, 321 . . . 391, and de-interleavers 312, 322 . . . 382. Wherein, an input terminal of the pre-decoding unit 311 is coupled to an input terminal of the pre-decoding apparatus 30. The output terminals of the pre-encoding units 311, 321 . . . 381 are correspondingly coupled to the input terminals of the de-interleavers 312, 322 . . . 382, respectively. The output terminals of the de-interleavers 312, 322 . . . 382 are correspondingly coupled to the input terminals of the pre-decoding units 321 . . . 391, respectively. The output terminal of the pre-decoding unit 391 is coupled to an output terminal of the pre-decoding apparatus 30. The pre-decoding units 311, 321 . . . 391 are used for decoding according to an input signal vector thereof, respectively. The pre-decoding units 311, 321 . . . 391 can also be used for decoding according to an input signal vector thereof and a set of reference functions. The de-interleavers 312, 322 . . . 382 are used for de-interleaving to the input signal. According to an aspect of the embodiment, the pre-decoding units can be MAP decoding units, and each pre-decoding unit can be composed of a plurality of pre-decoders having a lower dimension than that of the pre-decoding unit. Taking an 8-dimensional decoding unit as an example, the 8-dimensional decoding unit can be composed of four 2-dimensional pre-decoders. By composing a pre-decoding unit having a higher dimension by a plurality of pre-decoders having a lower dimension, time for decoding can be reduced, and the computation complexity thereof can also be lowered.

Figure 3B:
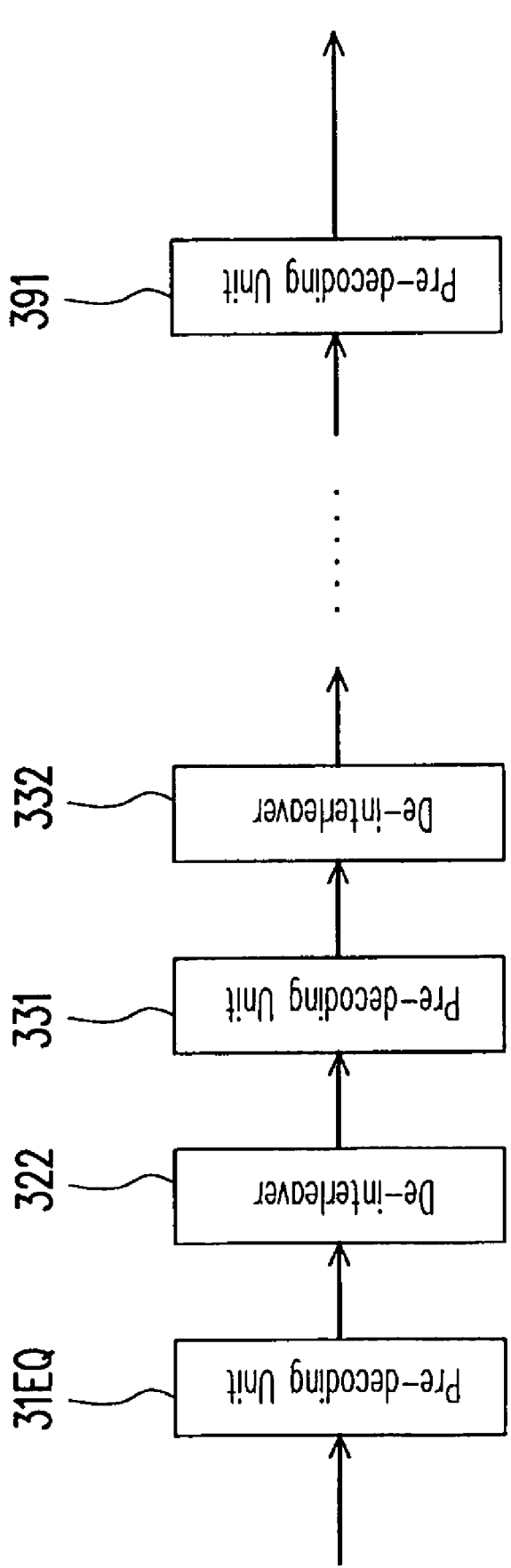
FIG. 3B is a system block diagram illustrating a pre-decoding apparatus 31 according to an embodiment of the present invention.

Referring to FIG. 3B, it shows a system block diagram illustrating a pre-decoding apparatus 31 according to an embodiment of the present invention. It is known that if there is a pre-decoding unit is adapted to provide an equivalent performance and function of all of the pre-decoding unit 311, the de-interleaver 312, and the pre-decoding unit 321 of FIG. 3A, such a pre-decoding unit can be used to replace the pre-decoding unit 311, the de-interleaver 312, and the pre-decoding unit 321 of FIG. 3A. As shown in FIG. 3B, it shows a pre-decoding unit 31EQ which is adapted to provide an equivalent performance and function of all of the pre-decoding unit 311, the de-interleaver 312, and the pre-decoding unit 321 of FIG. 3A. Therefore, it is not a limitation that the times of interleaving conducted by the pre-encoding apparatus must be equal to the times of de-interleaving conducted by the pre-decoding apparatus. Similarly, it is also not a limitation that the times of pre-encoding conducted by the pre-encoding apparatus must be equal to the times of pre-decoding conducted by the pre-decoding apparatus.

Figure 3C:
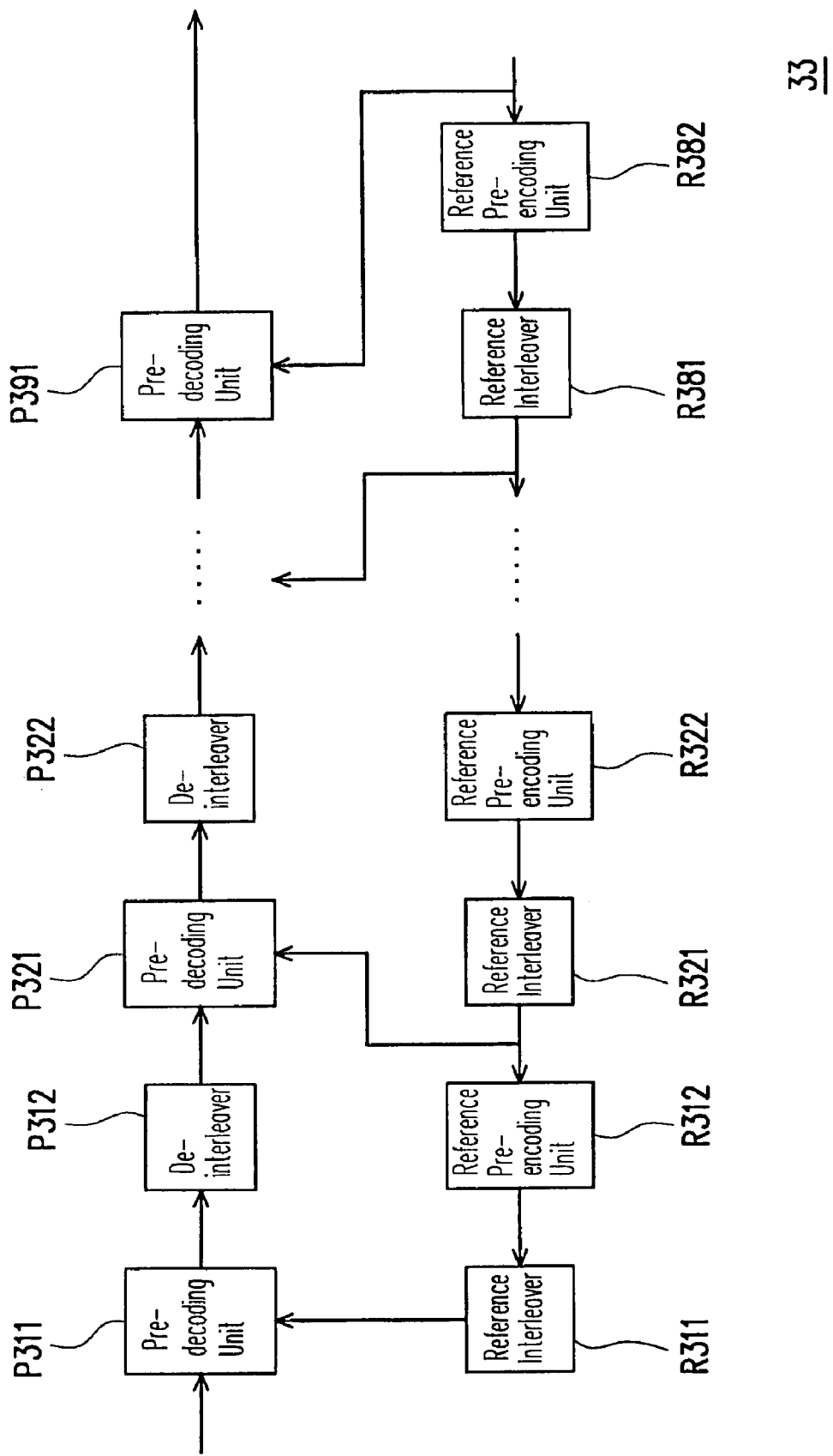
FIG. 3C is a system block diagram illustrating a pre-decoding apparatus 33 according to an embodiment of the present invention.

FIG. 3C is a system block diagram illustrating a pre-decoding apparatus 33 according to an embodiment of the present invention. FIG. 3C differs from FIG. 3A in that it shows a pre-decoding apparatus 33 which further includes reference pre-encoding units R312, R322 . . . R382, and reference interleavers R311, R321 . . . R381. Wherein, an input terminal of the reference pre-encoding unit R382 is provided for receiving a reference signal vector. The reference signal vector is obtained by processing an output signal vector of a pre-decoding unit P391 with post-end circuit other than the pre-decoding apparatus 33. The reference signal vector can also be the output signal vector of the pre-decoding unit P391. The output terminals of the reference pre-encoding unit R312, R322 . . . R382 are respectively coupled to the input terminals of the reference interleavers R311, R321 . . . R381. The output terminals of the reference interleavers R311, R321 . . . R381 are respectively coupled to another input terminals of the pre-decoding units P311, P321 . . . P381. The output terminal of the pre-decoding unit P391 is coupled to an output terminal of the pre-decoding apparatus 33, and another input terminal of the pre-decoding unit is used to receive the reference signal vector. The input terminals of the reference pre-encoding units R312, R322 . . . R372 are respectively coupled to the output terminals of the reference interleavers R321, R331 . . . R381.

The pre-decoding units P311, P321 . . . P391 can also take the decoding results thereof as a set of reference functions inputted thereby. Or as shown in FIG. 3C, each set of reference functions of the pre-decoding units P311, P321 . . . P391 are generated by the reference pre-encoding units R312, R322 . . . R382, and the reference interleavers R311, R321 . . . R381. The reference pre-encoding units R312, R322 . . . R382 are adapted for encoding according to the input signals to generate a plurality of reference functions which constitute a set of reference functions. The reference interleavers R311, R321 . . . R381 conduct interleaving processes to a plurality of sets of corresponding reference functions, respectively, and transmit the interleaved sets of reference functions to corresponding pre-decoding units P311, P321 . . . P381, respectively. In the present embodiment, the reference pre-encoding units R312, R322 . . . R382 can be MAP encoding units, while the pre-decoding units P311, P321 . . . P391 can be MAP decoding units.

The pre-decoding apparatuses 30 and 33 of the foregoing embodiments correspond to the pre-encoding apparatus 20 of FIG. 2A, so that each of the pre-decoding apparatuses 30 and 33 includes 9 pre-decoding units, and 8 de-interleavers. However, these embodiments are not used to limit the scope of the present invention. For example, the pre-decoding apparatus 30 can be substituted by the pre-decoding apparatus 31 of FIG. 3B, so that it turns to the embodiment in which the pre-decoding apparatus 31 and the pre-encoding apparatus 20 are asymmetric.

Referring to FIG. 3C again, the quantity of the reference pre-encoding units and the reference interleavers is one less than the quantity of the pre-decoding units. However, it is not used to restrict the present invention. Those skilled in the art may learn the asymmetric design by referring to FIGS. 3A and 3B.

Figure 3D:
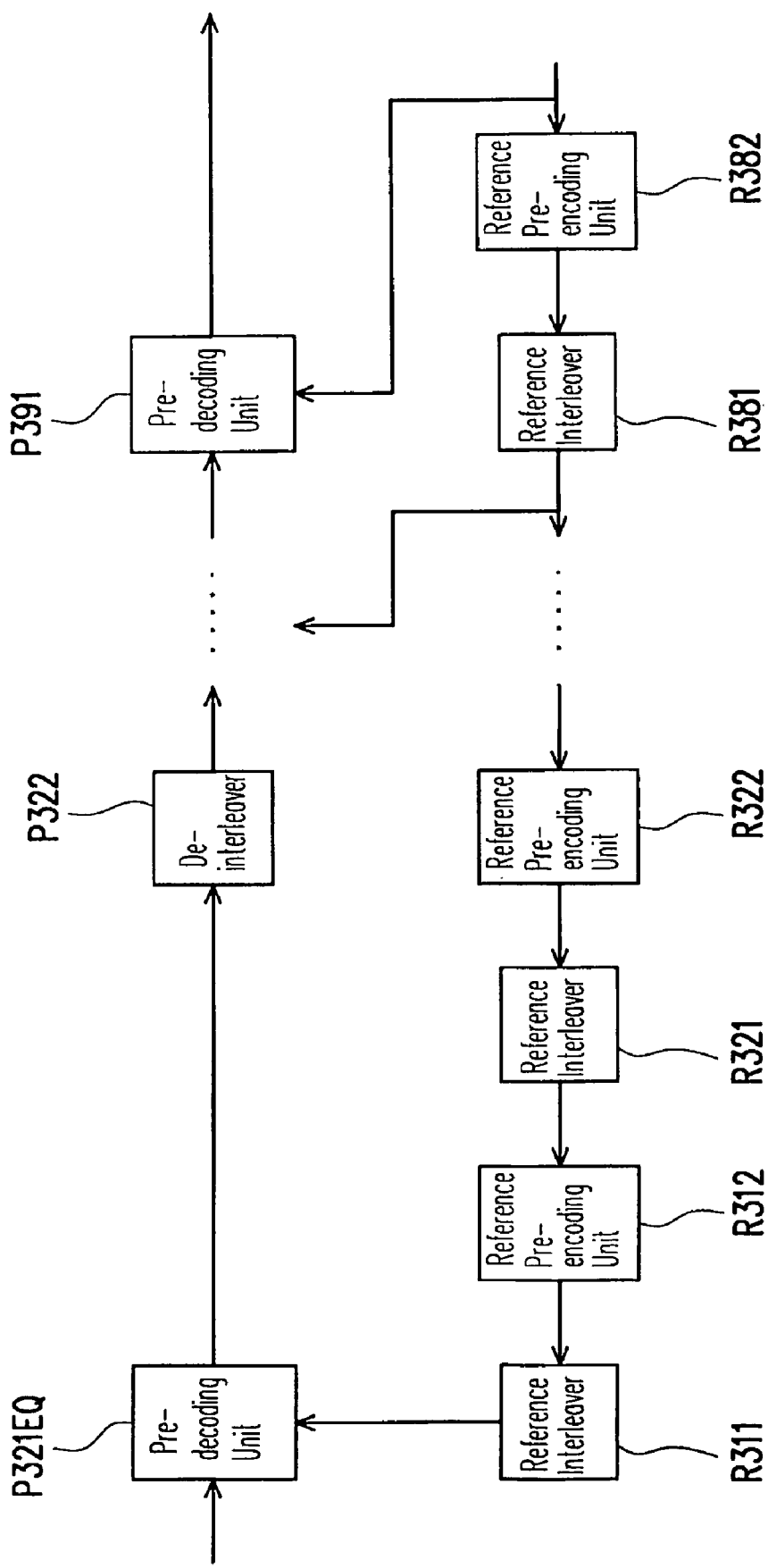
FIG. 3D is a system block diagram illustrating a pre-decoding apparatus 34 according to an embodiment of the present invention.

Further, referring to FIG. 3D, FIG. 3D is a system block diagram illustrating a pre-decoding apparatus 34 according to an embodiment of the present invention. The pre-decoding apparatus 34 provided in FIG. 3D is functionally equivalent with the pre-decoding apparatus 33 provided in FIG. 3D. Specifically, a pre-decoding unit P321EQ is functionally equivalent with a cascade structure composed of the serially connected pre-decoding units P311, P321 and the reference de-interleaver R312 of FIG. 3C. Because the cascade structure composed of the serially connected pre-decoding units P311, P321 and the reference de-interleaver R312 has been replaced by the pre-decoding unit P321EQ, an output terminal of the reference interleaver R321 of FIG. 3D is only coupled to an input terminal of the reference pre-decoding unit R312.

Figure 3E:
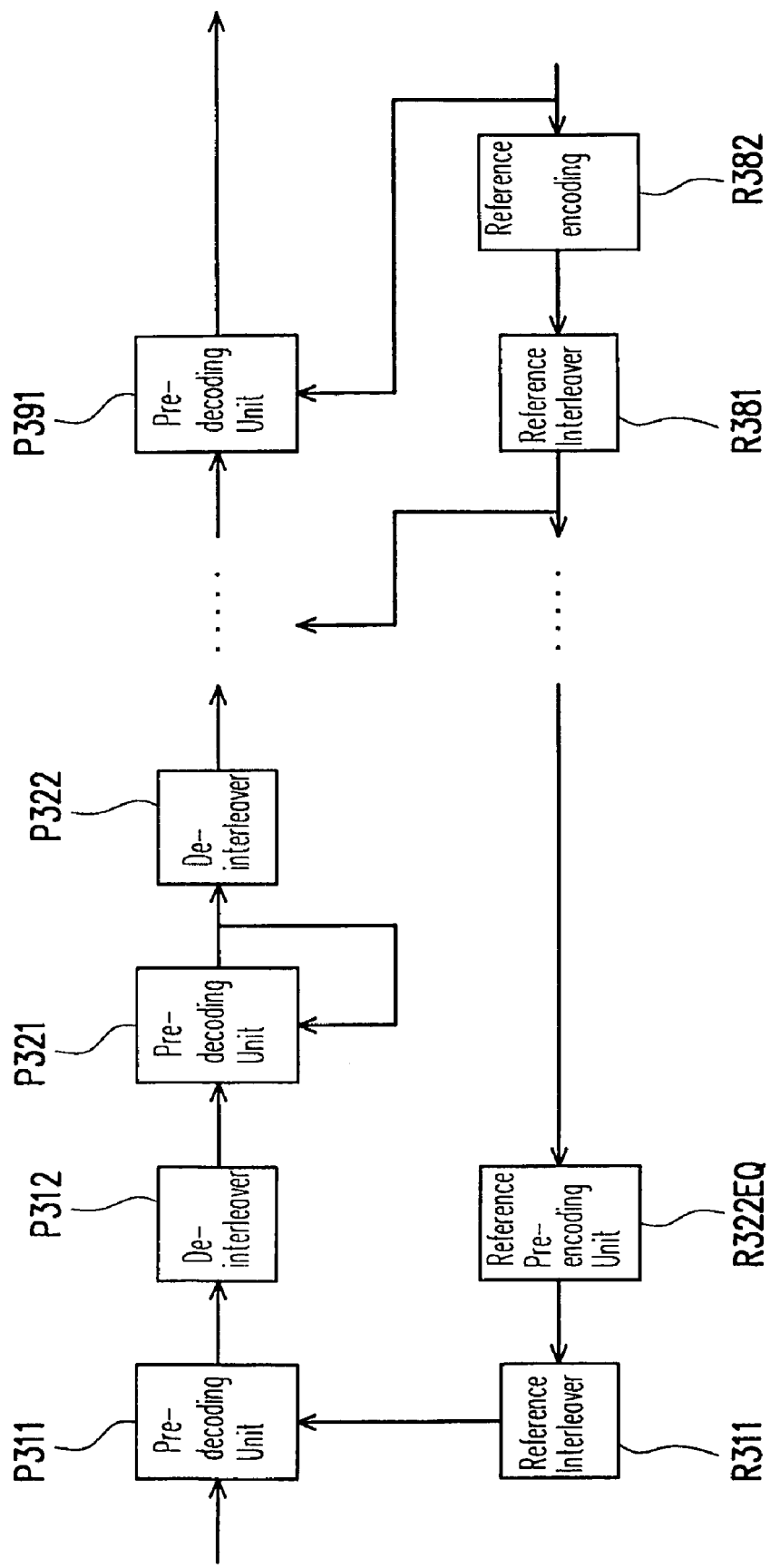
FIG. 3E is a system block diagram illustrating a pre-decoding apparatus 35 according to an embodiment of the present invention.

Referring to FIG. 3E, FIG. 3E is a system block diagram illustrating a pre-decoding apparatus 35 according to an embodiment of the present invention. The pre-decoding apparatus 35 and the pre-decoding apparatus 33 of FIG. 3C are functional equivalent to each other. A reference pre-encoding unit R322EQ is functionally equivalent with a cascade structure composed of the serially connected the reference pre-encoding units R312, R322 and the reference interleaver R321, and the output terminal of the pre-decoding unit P321 of FIG. 3E is coupled to the other input terminal of the pre-decoding unit P321. Because the cascade structure composed of the serially connected the reference pre-encoding units R312, R322 and the reference interleaver R321 has been replaced by the reference pre-encoding unit R322EQ, the output terminal of the pre-decoding unit P321 is coupled to the other input terminal of the pre-decoding unit P321, so as to allow the pre-decoding unit P321 to solve and obtain a set of probability functions.

Figure 3F:
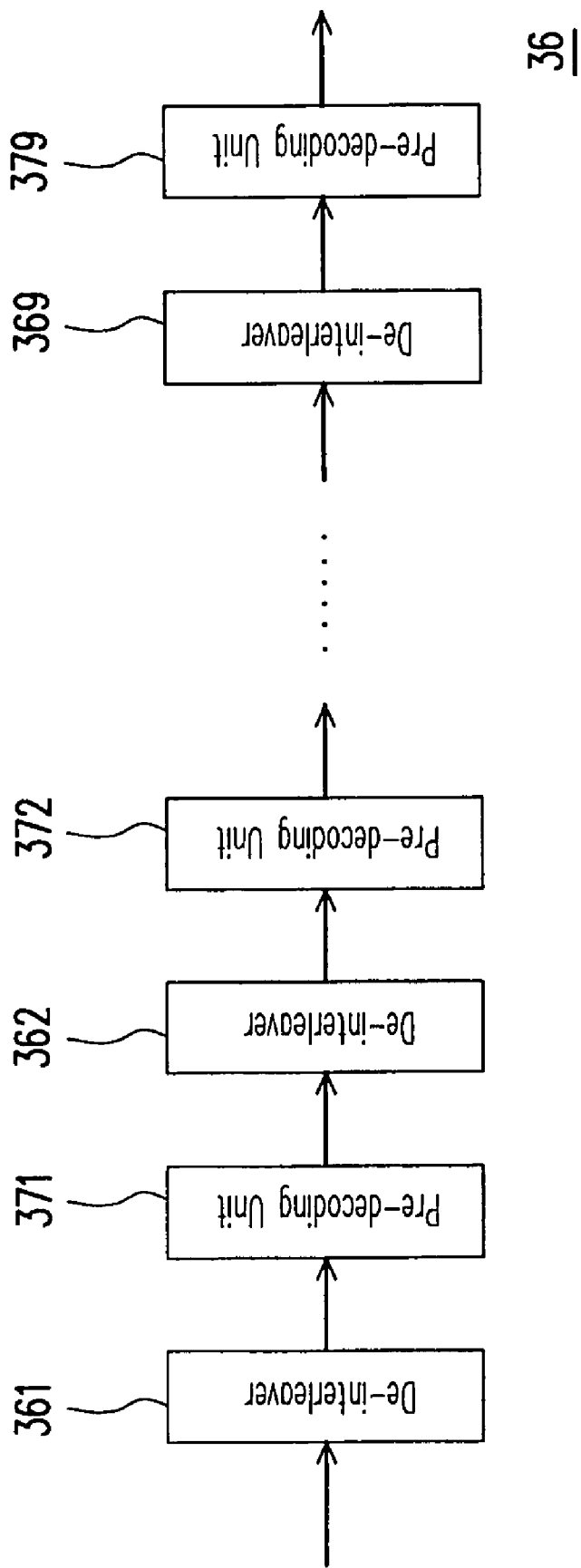
FIG. 3F is a system block diagram illustrating a pre-decoding apparatus 36 according to an embodiment of the present invention.

Referring to FIG. 3F, FIG. 3F is a system block diagram illustrating a pre-decoding apparatus 36 according to an embodiment of the present invention. The pre-decoding apparatus 36 is provided corresponding to the pre-encoding apparatus 21 as shown in FIG. 2B. Naturally, this embodiment is not used to restrict the present invention, and hose skilled in the art may vary the previously disclosed to obtain the asymmetric situation.

Figure 4A:
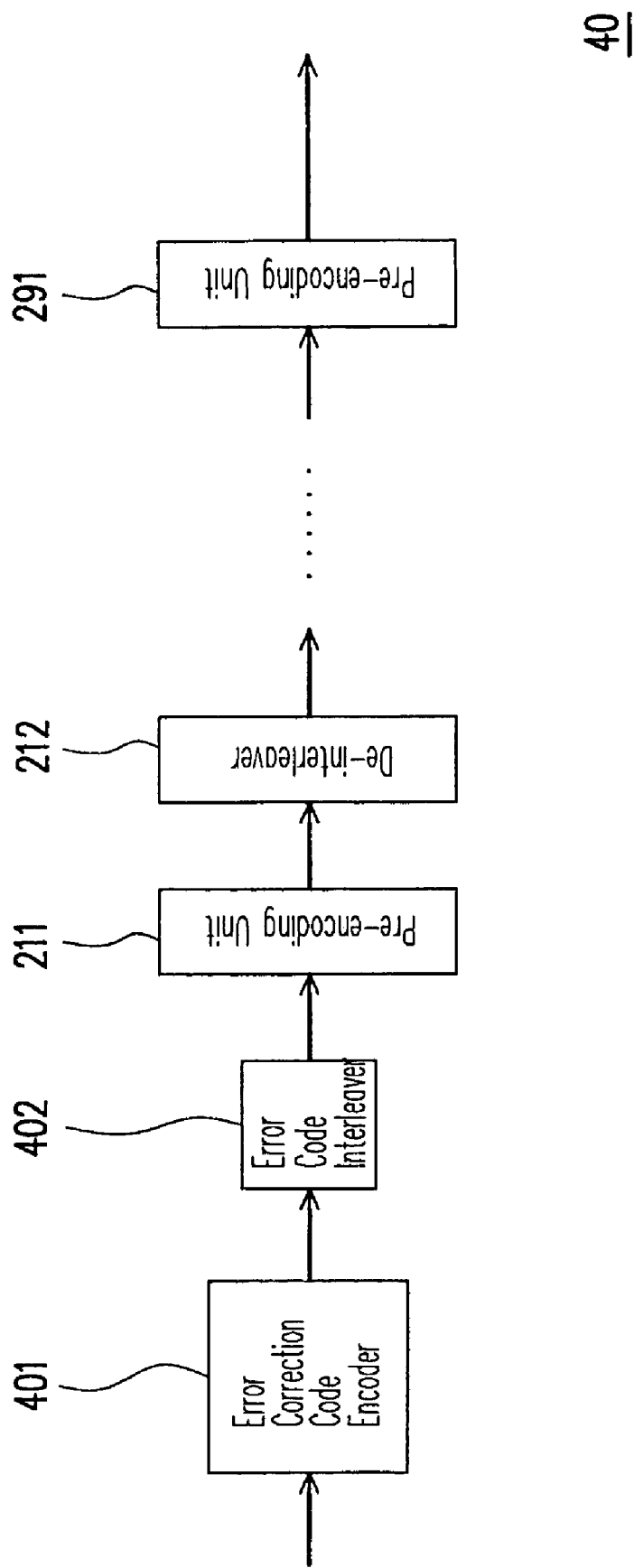
FIG. 4A is a system block diagram illustrating a pre-encoding apparatus 40 including an error correction code encoder 401 according to an embodiment of the present invention.
Figure 4B:
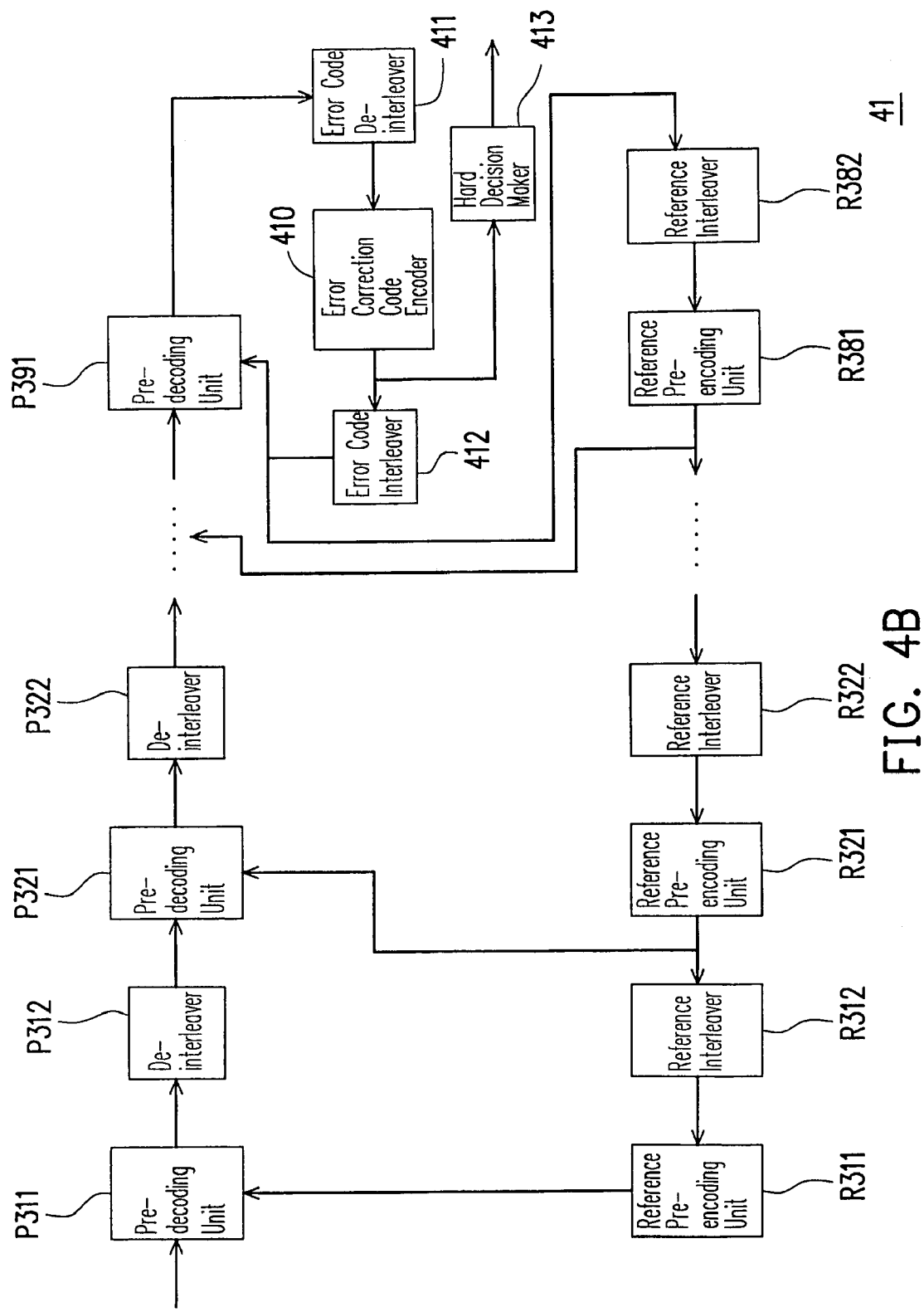
FIG. 4B is a system block diagram illustrating a pre-decoding apparatus 41 including an error correction code decoder 410 according to an embodiment of the present invention.

Referring to FIGS. 4A and 4B, FIG. 4A is a system block diagram illustrating a pre-encoding apparatus 40 including an error correction code encoder 401 according to an embodiment of the present invention. FIG. 4B is a system block diagram illustrating a pre-decoding apparatus 41 including an error correction code decoder 410 according to an embodiment of the present invention.

Compared to the pre-encoding apparatus 20 of FIG. 2A, the pre-encoding apparatus 40 of FIG. 4A further includes an error correction code encoder 401 and an error code interleaver 402. Wherein, an output terminal of the error code interleaver 402 is coupled to an input terminal of a pre-encoding unit 211. An input terminal of the error code interleaver 402 is coupled with an output terminal of the error correction code encoder 401. An input terminal of the error correction code encoder 401 is coupled with an input terminal of the pre-encoding apparatus 40. The error correction code encoder 401 is provided for performing an error correction code encoding to signal vectors inputted therein. The error code interleaver 402 is provided for performing interleaving to the signal vectors outputted from the error correction code encoder 401. However, it should be noted that the connection between the error correction code encoder 401 and the error code interleaver 402 is given here for exemplification purpose only without restricting the scope of the present invention.

Compared to the pre-encoding apparatus 33 of FIG. 3C, the pre-decoding apparatus 41 of FIG. 4A further includes an error correction code decoder 410, an error code de-interleaver 411, and an error code interleaver 412, and a hard decision maker 413. Wherein, an input terminal of the error code de-interleaver 411 is coupled with an output terminal of a pre-decoding unit P391. An output terminal of the error code de-interleaver 411 is coupled to an input terminal of the error correction code decoder 410. An input terminal of the error code interleaver 412 is coupled with an output terminal of the error correction code decoder 410. An output terminal of the error code interleaver 412 is coupled to another input terminal of the pre-decoding unit P391 and an input terminal of a reference pre-encoding unit R382. An input terminal of the hard decision maker 413 is coupled to the output terminal of the error correction code decoder 410. An output terminal of the hard decision maker 413 is coupled to the output terminal of the pre-decoding apparatus 41.

The hard decision maker 413 is provided for making a hard decision to the inputted signals therein. The error code interleaver 412 is provided for interleaving. The error code de-interleaver 411 is provided for de-interleaving. The error correction decoder 410 is provided for decoding error correction codes. The error correction code encoder 401 is provided for the error correction code encoding. The error correction codes can be but are not restricted to be turbo codes or convolution codes, and so on. The connection of the error correction code decoder 410, the error code de-interleaver 411, and the error code interleaver 412 can be adaptively modified and is not used to limit the scope of the present invention.

Figure 5B:
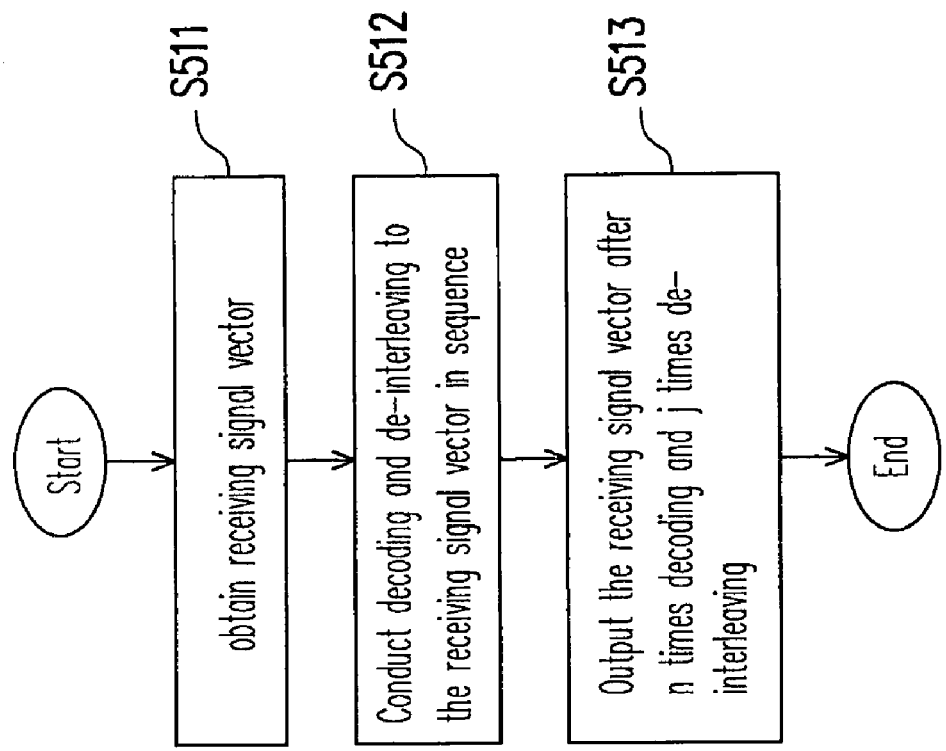
FIG. 5B is a flow chart illustrating a pre-decoding method according to an embodiment of the present invention.
Figure 5A:
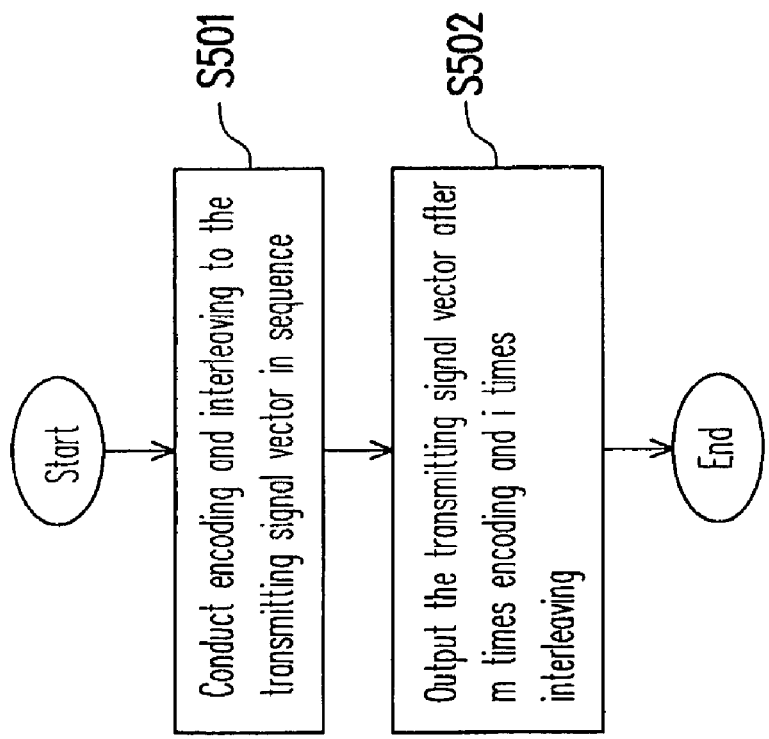
FIG. 5A is a flow chart illustrating a pre-encoding method according to an embodiment of the present invention.

Then referring to FIG. 5A, it is a flow chart illustrating a pre-encoding method according to an embodiment of the present invention. In step S501, a transmitting signal vector, including a plurality of transmitting signals, is conducted with encoding and interleaving processes. Wherein the encoding processes are conducted for m times, and the interleaving processes are conducted for i times, and m≧2, and i≧1. Taking encoding before interleaving as an example, except the $m^{th}$ encoding process, there would be an interleaving process following each time of encoding process, and the times for interleaving would be less 1 than the times for encoding, that is m=i+1; or otherwise taking interleaving before encoding as an example, there would be an encoding process following each time of interleaving process, and the times for encoding and the times for interleaving would be identical, that is m=i. However, the above embodiments are not given for limiting the scope of the present invention. In general, m and i are required to satisfy the above-mentioned conditions, m≧2, and i≧1, while the sequences for interleaving and encoding are not restricted. Then, in step S502, after conducted with the m times encoding and i times interleaving, the transmitting signal vector is outputted.

Further, at step S501, each time of encoding to the transmitting signal vector can be conducted by dividing the transmitting signal vector into a plurality of subsets, and encoding each of the subsets with a lower dimensional encoding method, wherein dimensions of different subsets can be identical or different. In such a way, a computation complexity of the encoding processes can be lowered, so as to save the time used for encoding. However, above-described approaches are not used to limit the scope of the present invention.

Referring to FIG. 5B, FIG. 5B is a flow chart illustrating a pre-decoding method according to an embodiment of the present invention. In step S511, a receiving signal vector is received, in which the receiving signal vector includes a plurality of receiving signals. Then, in step S512, the receiving signal vector is conducted with decoding and de-interleaving processes, in which the decoding processes are conducted for n times, and the de-interleaving processes are conducted for j times, wherein n≧2, and j≧1. Taking decoding before de-interleaving as an example, except the $n^{th}$ decoding process, there would be a de-interleaving process following each time of decoding process, and the times for de-interleaving would be less 1 than the times for decoding and, that is n=j+1; or otherwise taking de-interleaving before decoding as an example, there would be a decoding process following each time of de-interleaving process, and the times for decoding and the times for de-interleaving would be identical, that is n=j. However, the above embodiments are not given for restricting the scope of the present invention. In general, n and j are required to satisfy the above-mentioned conditions, n≧2, and j≧1, while the sequences for interleaving and encoding are not restricted. Then, in step S513, after conducted with the n times decoding and j times de-interleaving, the receiving signal vector is outputted.

Further, at step S512, each time of decoding to the receiving signal vector can be conducted by dividing the receiving signal vector into a plurality of subsets, and decoding each of the subsets with a lower dimensional decoding method, wherein dimensions of different subsets can be identical or different. In such a way, a computation complexity of the decoding processes can be lowered, so as to save the time used for decoding. However, above-described approaches are not used to limit the scope of the present invention. Further, in order to further lower the error probability of the present invention, the decoding methods can be but is not restricted to be a MAP decoding method.

Referring to FIG. 3C, the foregoing step S512 for decoding further includes the following steps: (a) conducting j times of encoding and interleaving processes to the result of the decoding and de-interleaving processes conducted to the receiving signal vector, so as to obtain j sets of reference functions, each set of reference functions including a plurality of reference functions; (b) referring to the $1^{st}$ through the $j^{th}$ sets of reference functions in conducting the $1^{st}$ through the $(n-1)^{th}$ decoding processes, and referring to the previous $n^{th}$ decoding process in conducting the $n^{th}$ decoding process.

Figure 6A:
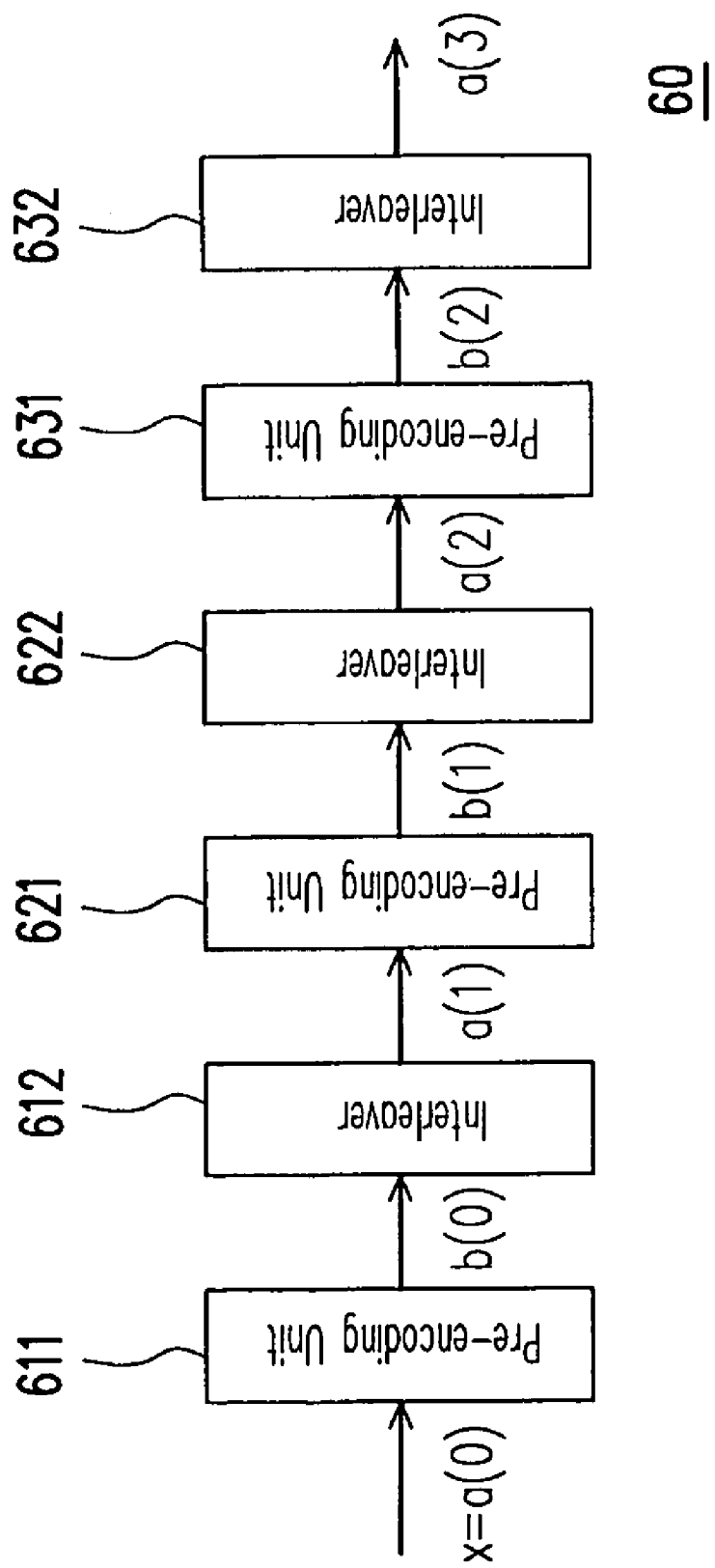
FIG. 6A is a system block diagram illustrating a pre-encoding apparatus 60 according to an embodiment of the present invention.

Next, the decoding process is described in more details. However, prior to that it should be noted that the illustration given below is for an embodiment rather than restriction of the present invention. FIG. 6A is a system block diagram illustrating a pre-encoding apparatus 60 according to an embodiment of the present invention. Referring to FIG. 6A, the pre-encoding apparatus 60 includes three pre-encoding units 611, 621, 631 and three interleavers 612, 622, 632. The pre-encoding apparatus 60 is provided in correspondence with a pre-decoding apparatus 70 which is going to be introduced in FIG. 6C later. As shown in FIG. 6A, a(0) represents a transmitting signal vector; b(0) through b(2) represent signal vectors outputted from the pre-encoding units 611, 621, 631, respectively, after being encoded thereby; and a(1) through a(3) represent signal vectors outputted from the interleavers 612, 622, 632, respectively after being interleaved thereby.

Figure 6B:
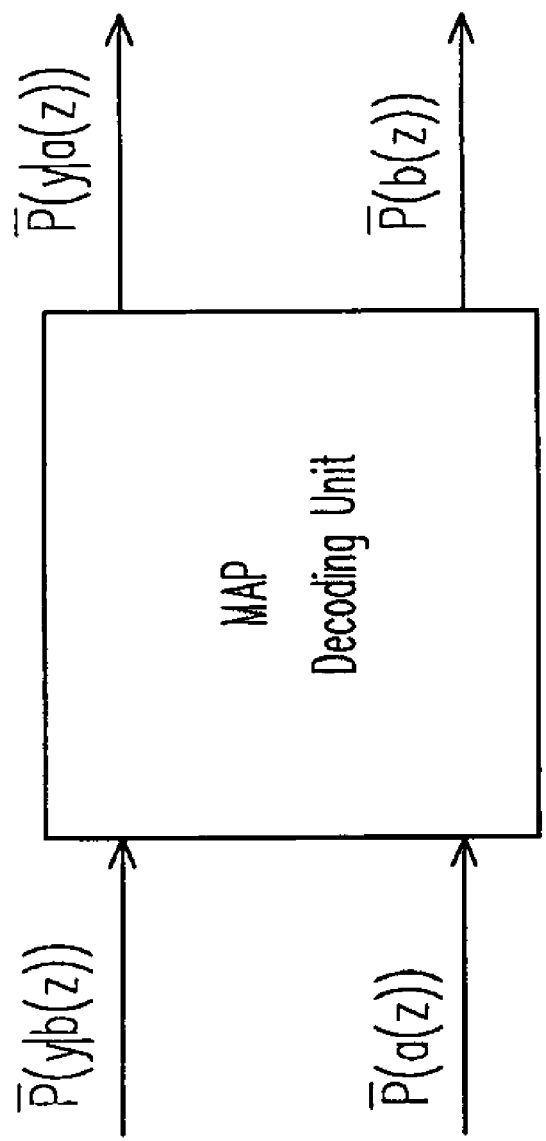
FIG. 6B is a block diagram illustrating a MAP decoding unit 69.
Figure 6C:
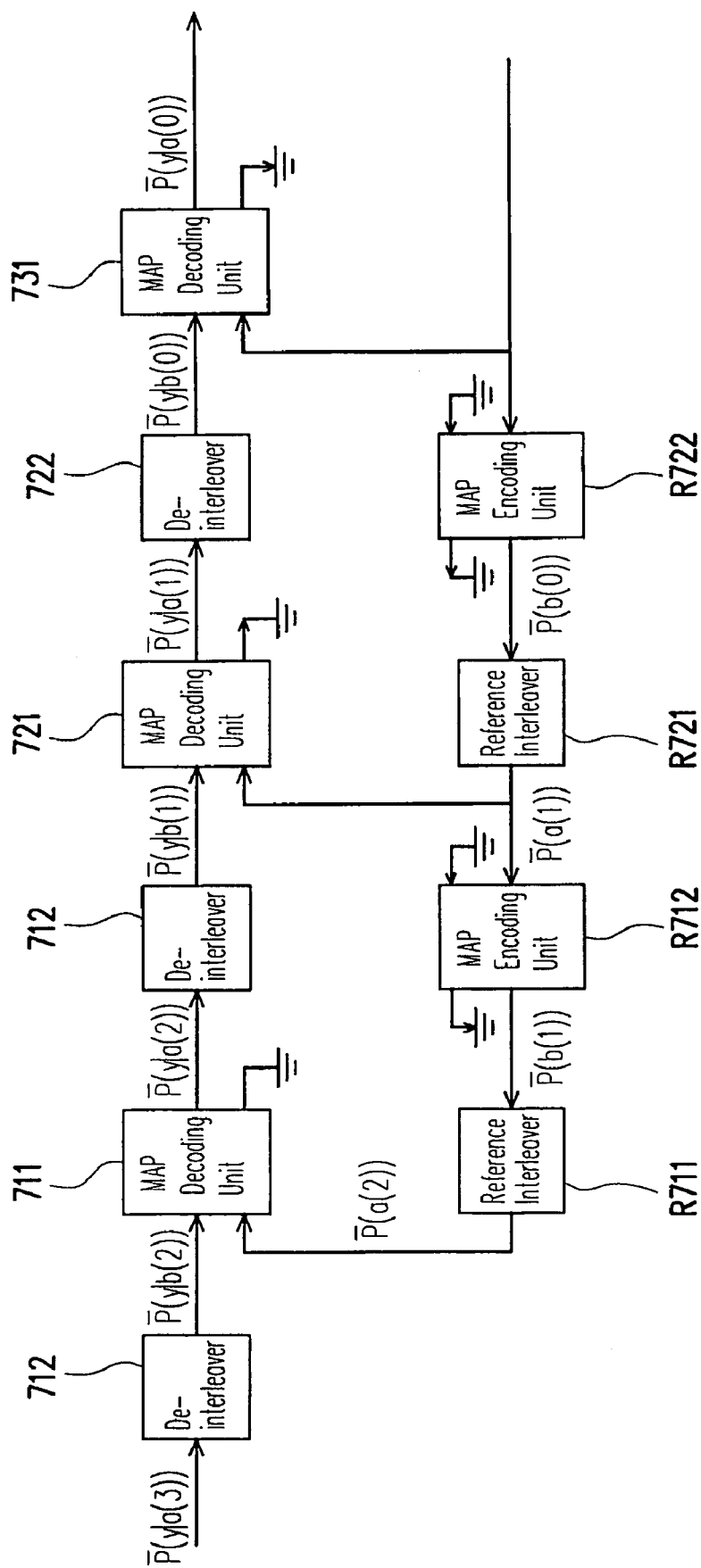
FIG. 6C is a system block diagram illustrating a pre-decoding apparatus 70 according to an embodiment of the present invention.

FIG. 6C is a system block diagram illustrating a pre-decoding apparatus 70 according to an embodiment of the present invention. Prior to discussing the pre-encoding apparatus 70 of FIG. 6C, please refer to FIG. 6B first. FIG. 6B is a block diagram illustrating a MAP decoding unit 69. As taught above, the pre-decoding unit can be realized with a MAP decoding units 69. The MAP decoding unit 69 includes two input terminals and two output terminals, respectively. One input terminal is used for receiving a set of prior probability functions $\overline{P}(y|b(z))$ of a signal vector after being conducted with z times of interleaving processes and z+1 times encoding processes, and another input terminal is used for receiving a set of posterior probability functions $\overline{P}(a(z))$ of a signal vector after being conducted with z times of interleaving processes and z times of encoding processes. The MAP decoding unit 69 decodes according to the inputs received at the two input terminals thereof, and outputs a set of prior probability functions $\overline{P}(y|a(z))$ of the signal vector after being conducted with z times of interleaving processes and z times of encoding processes, and a set of posterior probability functions $\overline{P}(b(z))$ of the signal vector after being conducted with z times of interleaving processes and z−1 times of encoding processes.

Then, referring to FIG. 6C, it is a system block diagram illustrating a pre-decoding apparatus 70 according to an embodiment of the present invention. The pre-decoding apparatus 70 is provided for decoding signals outputted from the pre-encoding apparatus 60. The pre-decoding apparatus 70 employs MAP decoding units to comply with the pre-decoding units, while the pre-encoding units are complied with MAP encoding units. In the current embodiment, the MAP encoding units are structurally identical with the MAP decoding units. However, this is not used to limit the scope of the present invention. With respect to the MAP decoding units 711, 721, 731, because $\overline{P}(b(3))$, $\overline{P}(b(2))$, and $\overline{P}(b(1))$ won't be used hereby, output terminals of the MAP decoding units 711, 721, 731 which output $\overline{P}(b(3))$, $\overline{P}(b(2))$, and $\overline{P}(b(1))$ respectively, are grounded. As to the MAP encoding units R712 and R722, because neither $\overline{P}(y|b(1))$ and $\overline{P}(y|b(0))$ are required in obtaining $\overline{P}(b(1))$ and $\overline{P}(b(0))$, and $\overline{P}(y|a(1))$ and $\overline{P}(y|a(0))$ are not used in the embodiment, output terminals which output $\overline{P}(y|a(1))$ and $\overline{P}(y|a(0))$, can be grounded, and input terminals which input $\overline{P}(y|b(1))$ and can also be grounded.

The MAP decoding unit 711 receives a set of probability functions $\overline{P}(y|b(2))$ of a signal vector b(2) (including probability functions of every signal of the receiving signal vector which are sequentially stored), and a set of posterior probability functions $\overline{P}(a(2))$ of a signal vector a(2). Then, $\overline{P}(y|a(2))$ and $\overline{P}(b(2))$ can be obtained by deducting in accordance with the Bayes theorem. Meanwhile, if the encoders employed in the pre-encoding units are Hadamard encoders, the complexity of the above calculation is about $O(N^3 \times \log_2 N)$. Functions of other MAP decoding units 721 and 731 can be learnt by referring to the MAP decoding unit 711, and are not described again hereby.

In the above embodiment, if the aforementioned probability functions are not sequentially stored, but the signals are assumed to be Gauss distributed, while only considering the average value $\mu$ and variance $\sigma^2$ thereof for MAP decoding, the computation complexity of computation can be lowered. In this case, no matter what kind of encoders are used for the pre-encoding units, the computation complexity is about $O(N \times \log_2 N)$.

Figure 7:
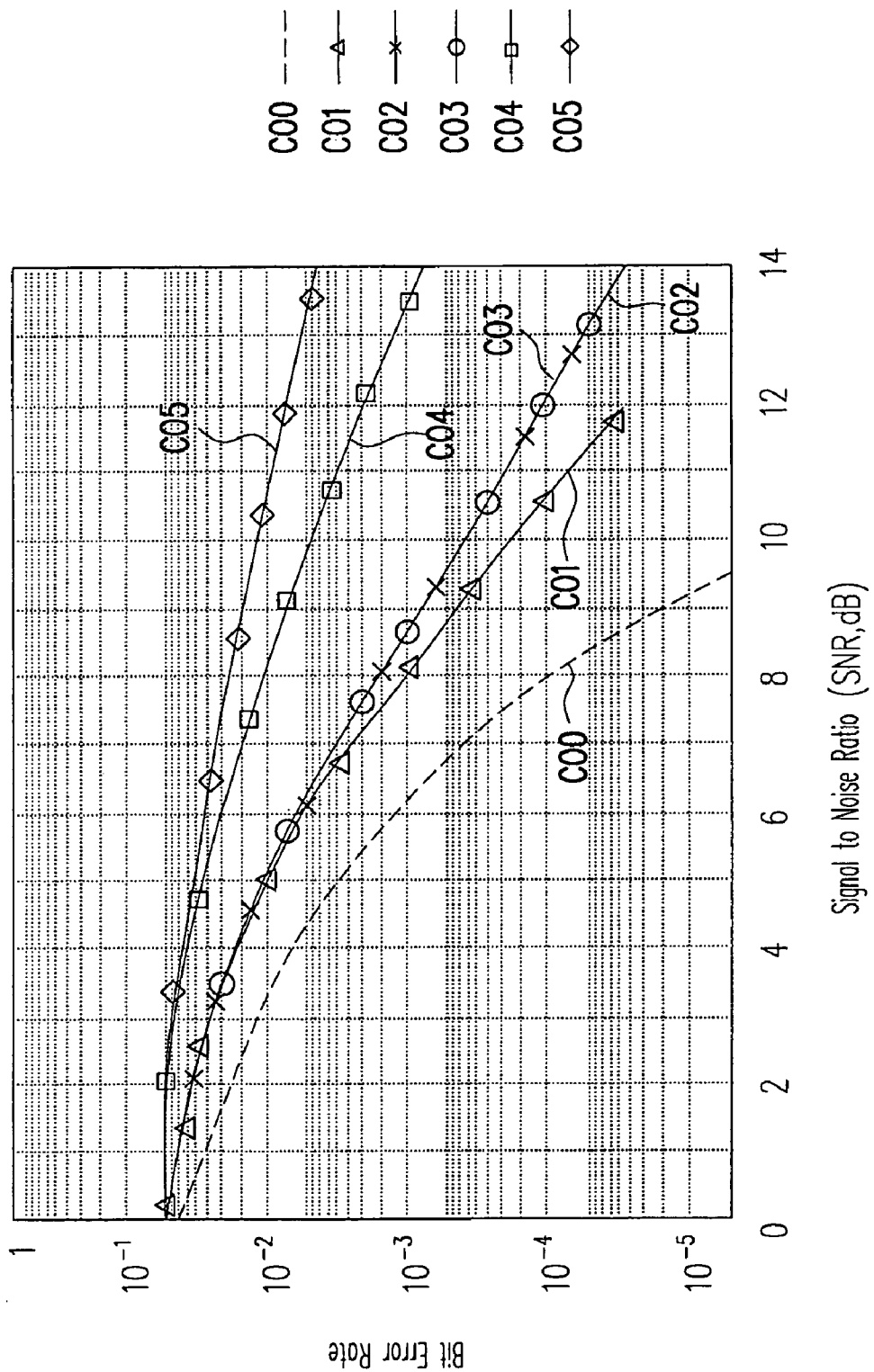
FIG. 7 is a curve diagram showing bit error rate curves of the pre-decoding apparatus according to an embodiment of the present invention.

Finally, referring to FIG. 7, it shows bit error rate curves of the pre-decoding apparatus according to an embodiment of the present invention. As shown in FIG. 7, there are 8 received signals transmitting on an attenuation channel. The curve C00 represents a bit error rate of a white Gauss noise channel. The curve C01 represents a bit error rate when the receiver adopts an ML detection method. The curve C02 represents a bit error rate when the receiver adopts the method according to the embodiment of the present invention. The curve 03 represents a bit error rate when the receiver adopts an IMUD method. The curve 04 represents a bit error rate when the receiver adopts an MMSE detection method. The curve 05 represents a bit error rate when the receiver adopts a ZF detection method. Further, the curves of FIG. 7 are obtained when the receiver adopts multi-dimensional signal sets (MDSS) incorporating with the OFDM system to achieve a maximum frequency diversity, in which each transmitting signal has been rotated by a certain phase before being transmitted into the corresponding pre-encoding unit.

It can be learnt from FIG. 7 that the bit error rate curve C02 of the receiver of the pre-decoding apparatus according to the embodiment of the present invention is close to the bit error rate curve C01 corresponding to the ML detection method, and has a lower computation complexity than that of the ML detection method. Further, although the curves are obtained corresponding to 8 received signals, when more signals are received, the bit error rate curve would further approach to the curve C00, and the present invention would achieve a better entire performance, while the computation complexity would be correspondingly raised a little (since the complexity is related to a quantity of the received signals).

In summary, the pre-encoding apparatus adopts a cascade structure composed of serially connected pre-encoding units and interleavers for performing a pre-encoding process, and the pre-decoding apparatus adopts a cascade structure composed of serially connected pre-decoding units and de-interleavers for performing a pre-decoding process. As such, the pre-encoding apparatus achieves a lower error rate, and each of the foregoing pre-encoding units can be constituted of a plurality of low dimensional pre-decoders so as to further reduce the computation complexity thereof.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for pre-encoding and pre-decoding, comprising:
   a pre-encoding apparatus, receiving a transmitting signal vector having a plurality of transmitting signals, and conducting m times encoding and i times interleaving to the transmitting signal vector, wherein m≧2, and i≧1, and the pre-encoding apparatus is constituted by randomly serially connected m pre-encoding units and i interleavers, wherein the transmitting signal vector is transmitted via the pre-encoding apparatus to a channel and configures a receiving signal vector having a plurality of receiving signals; and
   a pre-decoding apparatus, receiving the receiving signal vector from the channel, and conducting n times decoding and j times de-interleaving to the receiving signal vector so as to obtain the transmitting signal vector, wherein n≧2, and j≧1, and the pre-decoding apparatus is constituted by serially connected n pre-decoding units and j de-interleavers,
   wherein each of the pre-encoding units is composed of at least one encoder, and each of the pre-decoding units is composed of at least one decoder, wherein the encoder has a dimension lower than or equal to that of the pre-encoding unit, and the decoder has a dimension lower than or equal to that of the pre-decoding unit.

2. The system for pre-encoding and pre-decoding according to claim 1, wherein i=m−1, and output terminals of the first through the $(m-1)^{th}$ pre-encoding units are coupled to input terminals of the first through the $i^{th}$ interleavers, respectively; an output terminal of the $i^{th}$ interleaver is coupled to an input terminal of the $m^{th}$ pre-encoding unit; an input terminal of the first pre-encoding unit is coupled to an input terminal of the pre-encoding apparatus; and an output terminal of the $m^{th}$ pre-encoding unit is coupled to an output terminal of the pre-encoding apparatus; and
   wherein j=n−1, and output terminals of the first through the $(n-1)^{th}$ pre-decoding units are coupled to input terminals of the first through the $j^{th}$ de-interleavers, respectively; an output terminal of the $j^{th}$ de-interleaver is coupled to an input terminal of the $n^{th}$ pre-decoding unit; an input terminal of the first pre-decoding unit is coupled to an input terminal of the pre-decoding apparatus; and an output terminal of the $n^{th}$ pre-decoding unit is coupled to an output terminal of the pre-decoding apparatus.

3. The system for pre-encoding and pre-decoding according to claim 1, wherein i=m, and output terminals of the first through the $i^{th}$ interleavers are coupled to input terminals of the first through the $m^{th}$ pre-encoding units, respectively; output terminals of the first through the $(m-1)^{th}$ pre-encoding units are coupled to input terminals of the second through the $i^{th}$ interleavers, respectively; an input terminal of the first interleaver is coupled to an input terminal of, the pre-encoding apparatus; and an output terminal of the $m^{th}$ pre-encoding unit is coupled to an output terminal of the pre-encoding apparatus; and
   wherein j=n, and output terminals of the first through the $j^{th}$ de-interleavers are coupled to input terminals of the first through the $n^{th}$ pre-decoding units, respectively; output terminals of the first through the $(n-1)^{th}$ pre-decoding units are coupled to input terminals of the second through the $j^{th}$ interleavers, respectively; an input terminal of the first de-interleaver is coupled to an input terminal of the pre-decoding apparatus; and an output terminal of the $n^{th}$ pre-decoding unit is coupled to an output terminal of the pre-decoding apparatus.

4. The system for pre-encoding and pre-decoding according to claim 1, wherein the pre-decoding apparatus further comprises r reference pre-encoding units and q reference interleavers, all of which are serially connected one to another, the r reference pre-encoding units and q reference interleavers being provided for generating q sets of posterior probability functions of signal vectors for providing to q pre-decoding units, wherein the q pre-decoding units are adapted for receiving the q sets of posterior probability functions, and decoding according to inputs of the q pre-decoding units, wherein q≦n−1.

5. The system for pre-encoding and pre-decoding according to claim 4, wherein the pre-encoding apparatus further comprises an error correction code encoder and a first error code interleaver, an input terminal of the error correction encoder being coupled to the input terminal of the pre-encoding apparatus, an input terminal of the first error code interleaver being coupled to an output terminal of the error correction code encoder, an output terminal of the first error code interleaver being coupled to an input terminal of the first interleaver or the first pre-encoding unit; and
   wherein the pre-decoding apparatus further comprises a first error code de-interleaver, an error correction code decoder, a second error code interleaver, and a hard decision maker, an input terminal of the first error code de-interleaver being coupled to an output terminal of the $j^{th}$ de-interleaver or the $n^{th}$ pre-decoding unit, an input terminal of the error correction code decoder being coupled to an output terminal of the first error code de-interleaver, an input terminal of the second error code interleaver being coupled to an output terminal of the error correction code decoder, an output terminal of the second error code interleaver being coupled to another input terminal of the $n^{th}$ pre-decoding unit, the output terminal of the second error code interleaver being also coupled to an input terminal of the first reference pre-encoding unit or the first reference interleaver, an output terminal of the hard decision maker being coupled to the output terminal of the error correction code decoder, an input terminal of the hard decision maker being coupled to the input terminal of the error correction code decoder,
   wherein the first and the second error code interleavers are provided for conducting interleaving processes to inputs therein, and the first error code de-interleaver is provide for conducting a de-interleaving process to an input therein.

6. A pre-encoding apparatus, comprising:
   i interleavers; and
   m pre-encoding units, randomly serially connected with the i interleavers,
   wherein the pre-encoding apparatus receives a transmitting signal vector having a plurality of transmitting signals, and conducts m times encoding and i times interleaving, wherein m≧2, and i≧1,
   wherein each of the pre-encoding units is composed of at least one encoder, the encoder having a dimension lower than or equal to that of the pre-encoding unit.

7. The pre-encoding apparatus according to claim 6, wherein i=m−1, and output terminals of the first through the $(m-1)^{th}$ pre-encoding units are coupled to input terminals of the first through the $i^{th}$ interleavers, respectively; an output terminal of the $i^{th}$ interleaver is coupled to input terminal of the $m^{th}$ pre-encoding unit; an input terminal of the first pre-encoding unit is coupled to an input terminal of the pre-encoding apparatus; and an output terminal of the $m^{th}$ pre-encoding unit is coupled to an output terminal of the pre-encoding apparatus.

8. The pre-encoding apparatus according to claim 6, wherein i=m, and output terminals of the first through the $i^{th}$ interleavers are coupled to input terminals of the first through the $m^{th}$ pre-encoding units, respectively; output terminals of the first through the $(m-1)^{th}$ pre-encoding units are coupled to input terminals of the second through the $i^{th}$ interleavers, respectively; an input terminal of the first interleaver is coupled to an input terminal of the pre-encoding apparatus; and an output terminal of the $m^{th}$ pre-encoding unit is coupled to an output terminal of the pre-encoding apparatus.

9. The pre-encoding apparatus according to claim 6, further comprising:
an error correction code encoder, having an input terminal coupled to the input terminal of the pre-encoding apparatus; and
a first error code interleaver, for conducting an interleaving process to an input thereof, wherein the first error code interleaver has an input terminal coupled to an output terminal of the error correction code encoder, and an output terminal coupled to an input terminal of the first interleaver or the first pre-encoding unit.

10. A pre-decoding apparatus, comprising:
j de-interleavers; and
n pre-decoding units, serially connected with the j de-interleavers,
wherein the pre-decoding apparatus receives a receiving signal vector from a channel, and conducts n times decoding and j times de-interleaving to the receiving signal vector so as to obtain a transmitting signal vector, wherein $n \geq 2$, and $j \geq 1$,
wherein each of the pre-decoding units is composed of at least one decoder, the decoder having a dimension lower than or equal to that of the pre-decoding unit.

11. The pre-decoding apparatus according to claim 10, wherein j=n−1, and output terminals of the first through the $(n-1)^{th}$ pre-decoding units are coupled to input terminals of the first through the $j^{th}$ de-interleavers, respectively; an output terminal of the $j^{th}$ de-interleaver is coupled to an input terminal of the $n^{th}$ pre-decoding unit; an input terminal of the first pre-decoding unit is coupled to an input terminal of the pre-decoding apparatus; and an output terminal of the $n^{th}$ pre-decoding unit is coupled to an output terminal of the pre-decoding apparatus.

12. The pre-decoding apparatus according to claim 10, wherein j=n, and output terminals of the first through the $j^{th}$ de-interleavers are coupled to input terminals of the first through the $n^{th}$ pre-decoding units, respectively; output terminals of the first through the $(n-1)^{th}$ pre-decoding units are coupled to input terminals of the second through the $j^{th}$ interleavers, respectively; an input terminal of the first de-interleaver is coupled to an input terminal of the pre-decoding apparatus; and an output terminal of the $n^{th}$ pre-encoding unit is coupled to an output terminal of the pre-decoding apparatus.

13. The pre-decoding apparatus according to claim 10, further comprising r reference pre-encoding units and q reference interleavers, wherein all of the r reference pre-encoding units and q reference interleavers are serially connected one to another, the r reference pre-encoding units and q reference interleavers being provided for generating q sets of posterior probability functions of signal vectors for providing to q pre-decoding units, wherein the q pre-decoding units are adapted for receiving the q sets of posterior probability functions, and decoding according to inputs of the q pre-decoding units, wherein $q \leq n-1$.

14. The pre-decoding apparatus according to claim 13, further comprising:
a first error code de-interleaver, having an input terminal coupled to an output terminal of the $j^{th}$ de-interleaver or the $n^{th}$ pre-decoding unit;
an error correction code decoder, having an input terminal coupled to an output terminal of the first error code de-interleaver;
a second error code interleaver, having an input terminal coupled to an output terminal of the error correction code decoder, and an output terminal coupled to another input terminal of the $n^{th}$ pre-decoding unit, wherein the output terminal of the second error code interleaver is also coupled to an input terminal of the first reference pre-encoding unit or the first reference interleaver; and
a hard decision maker, having an output terminal coupled with the output terminal of the error correction code decoder, and an input terminal coupled to the input terminal of the error correction code decoder,
wherein the second error code interleavers is provided for conducting interleaving process to an input therein, and the first error code de-interleaver is provide for conducting a de-interleaving process to an input therein.

15. The pre-decoding apparatus according to claim 10, wherein each of the pre-decoding units is a maximum a posteriori (MAP) decoding unit composed of a plurality of MAP decoders having a dimension lower than that of the MAP decoding unit.

16. A method for pre-encoding, comprising:
conducting m times encoding and i times interleaving to a transmitting signal vector having a plurality of transmitting signals, wherein $m \geq 2$, and $i \geq 1$, and the sequence of encoding and interleaving is not restricted; and
outputting the transmitting signal vector after being conducted with m times encoding and i times interleaving,
wherein each time of encoding to the transmitting signal vector is conducted by dividing the transmitting signal vector into a plurality of subsets, and encoding each of the subsets with a lower dimensional encoding method, wherein dimensions of different subsets are identical or different.

17. A method for pre-decoding, comprising:
receiving a receiving signal vector having a plurality of receiving signals;
conducting n times decoding and j times de-interleaving to the receiving signal vector, in which $n \geq 2$, and $j \geq 1$; and
outputting the receiving signal vector after being conducted with n times decoding and (n−1) times de-interleaving,
wherein each time of decoding to the receiving signal vector is conducted by dividing the receiving signal vector into a plurality of subsets, and decoding each of the subsets with a lower dimensional decoding method, wherein dimensions of different subsets are identical or different.

18. The method for pre-decoding according to claim 17, wherein the n times decoding are n times maximum a posteriori (MAP) decoding.

19. The method for pre-decoding according to claim 17, wherein a process for decoding comprises the steps of:
- conducting p times encoding and q times interleaving to a result of n times decoding and j times de-interleaving the receiving signal vector, and obtaining q sets of probability reference functions, each of which comprising a plurality of probability functions; and
- referring to the q sets of probability reference functions in conducting q times decoding for obtaining a decoding result, wherein $q \leq n-1$.

* * * * *